United States Patent
Mukaibara et al.

(10) Patent No.: US 10,158,780 B2
(45) Date of Patent: Dec. 18, 2018

(54) IMAGE FORMING APPARATUS AND OPTICAL SENSOR DETECTING TARGET FORMED ON IMAGE CARRIER OR RECORDING MEDIUM

(71) Applicant: CANON KABUSHIKI KAISHA, Tokyo (JP)

(72) Inventors: Takuya Mukaibara, Susono (JP); Takashi Fukuhara, Higashikurume (JP); Kazushi Ino, Suntou-gun (JP); Naoki Nishimura, Susono (JP); Keisuke Nakano, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/868,186

(22) Filed: Jan. 11, 2018

(65) Prior Publication Data

US 2018/0139346 A1 May 17, 2018

Related U.S. Application Data

(63) Continuation of application No. 15/291,445, filed on Oct. 12, 2016.

(30) Foreign Application Priority Data

Nov. 6, 2015 (JP) ................. 2015-218798

(51) Int. Cl.
*G03G 15/00* (2006.01)
*H04N 1/06* (2006.01)
(Continued)

(52) U.S. Cl.
CPC ........... *H04N 1/0664* (2013.01); *G03G 15/04* (2013.01); *G03G 15/5058* (2013.01);
(Continued)

(58) Field of Classification Search
CPC .................................................. H04N 1/0664
(Continued)

(56) References Cited

U.S. PATENT DOCUMENTS 5,157,440 A 10/1992 Sawayama
6,853,817 B2 2/2005 Suzuki
(Continued)

FOREIGN PATENT DOCUMENTS

CN 1420395 A 5/2003
JP 2006-251686 A 9/2006
(Continued)

OTHER PUBLICATIONS

Search Report issued in European Patent Application No. 16189401.9 dated Mar. 17, 2017.
(Continued)

Primary Examiner — Quana M Grainger
(74) Attorney, Agent, or Firm — Fitzpatrick, Cella, Harper & Scinto

(57) ABSTRACT

An image forming apparatus includes a light-receiving unit that includes light-receiving elements arranged along a movement direction of a target formed on an image carrier, and is arranged so as to receive light emitted from a light-emitting unit and specularly reflected off the image carrier; a member configured to limit a size, in the movement direction, of diffused reflection light that is incident on the light-receiving unit; a selection unit configured to select whether or not each of the light-receiving elements in the light-receiving unit is an effective light-receiving element; a generation unit configured to generate a detection signal from an output of the effective light-receiving element; and a detection unit configured to detect a target formed on the image carrier based on the detection signal.

17 Claims, 21 Drawing Sheets

(51) Int. Cl.
  *G03G 15/04* (2006.01)
  *H04N 1/028* (2006.01)
  *H04N 1/50* (2006.01)
  *H04N 1/00* (2006.01)

(52) U.S. Cl.
  CPC ..... *H04N 1/00023* (2013.01); *H04N 1/00037* (2013.01); *H04N 1/00058* (2013.01); *H04N 1/0289* (2013.01); *H04N 1/50* (2013.01); *G03G 15/5062* (2013.01); *G03G 2215/00042* (2013.01); *G03G 2215/0132* (2013.01); *G03G 2215/0164* (2013.01)

(58) Field of Classification Search
  USPC .......................................................... 399/51
  See application file for complete search history.

(56) References Cited

U.S. PATENT DOCUMENTS

| | | | |
|---|---|---|---|
| 9,049,313 | B2 | 6/2015 | Mukaibara et al. |
| 9,213,290 | B2 | 12/2015 | Koyama et al. |
| 9,244,415 | B2 | 1/2016 | Yamaguchi et al. |
| 2004/0251435 | A1 | 12/2004 | Sawayama et al. |
| 2014/0168677 | A1 | 6/2014 | Mukaibara et al. |
| 2014/0226997 | A1 | 8/2014 | Koyama et al. |
| 2014/0308049 | A1 | 10/2014 | Yamaguchi et al. |
| 2015/0278662 | A1 | 10/2015 | Hosoya et al. |
| 2015/0293488 | A1 | 10/2015 | Mukaibara et al. |
| 2015/0301470 | A1 | 10/2015 | Tsuchiya et al. |
| 2017/0131657 | A1 | 5/2017 | Monden et al. |
| 2017/0131670 | A1 | 5/2017 | Ino et al. |

FOREIGN PATENT DOCUMENTS

| | | |
|---|---|---|
| JP | 2010-190685 A | 9/2010 |
| JP | 2013-045023 A | 3/2013 |
| JP | 2016-045311 A | 4/2016 |
| WO | 2013/061737 A1 | 5/2013 |

OTHER PUBLICATIONS

Office Action dated Oct. 12, 2018, in Chinese Patent Application No. 201610943103.0.

PRIOR ART

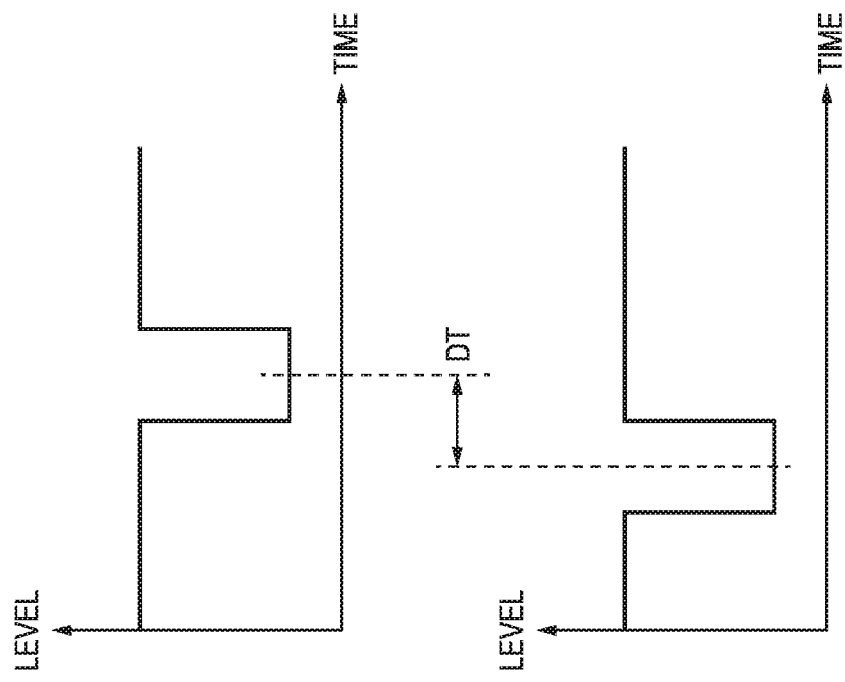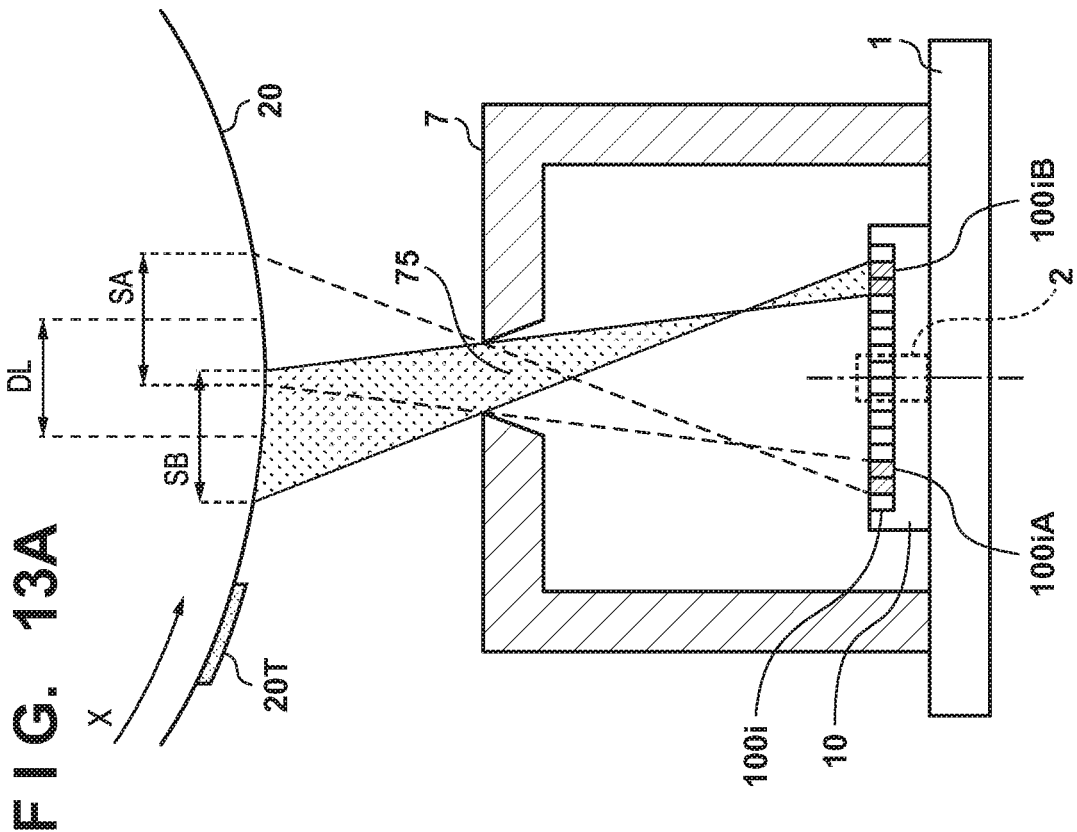

F I G. 15A
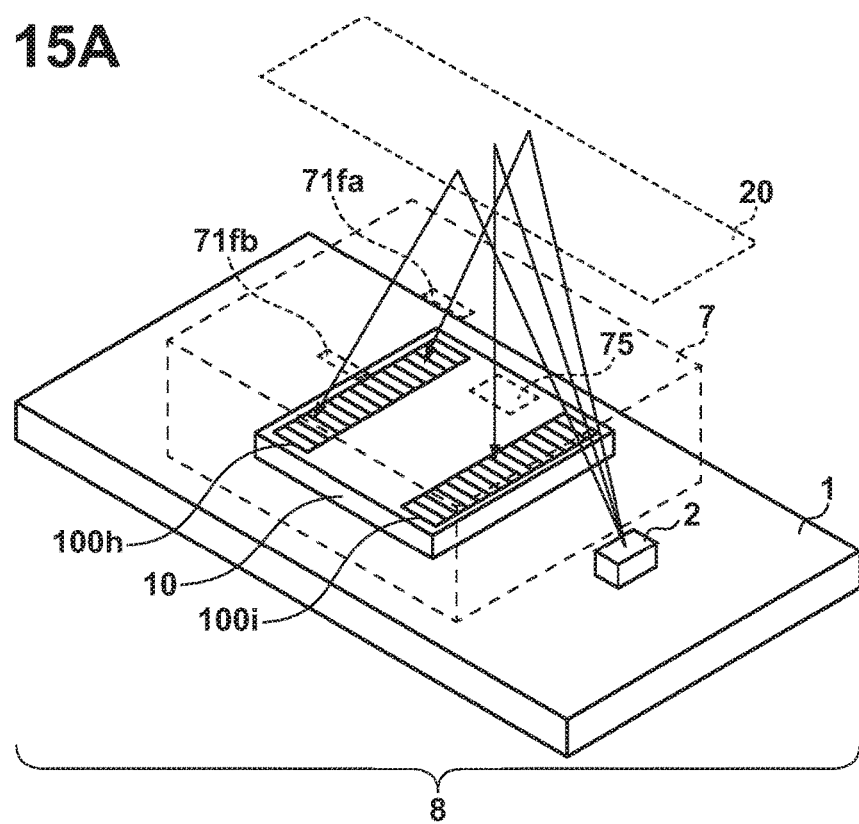
F I G. 15B
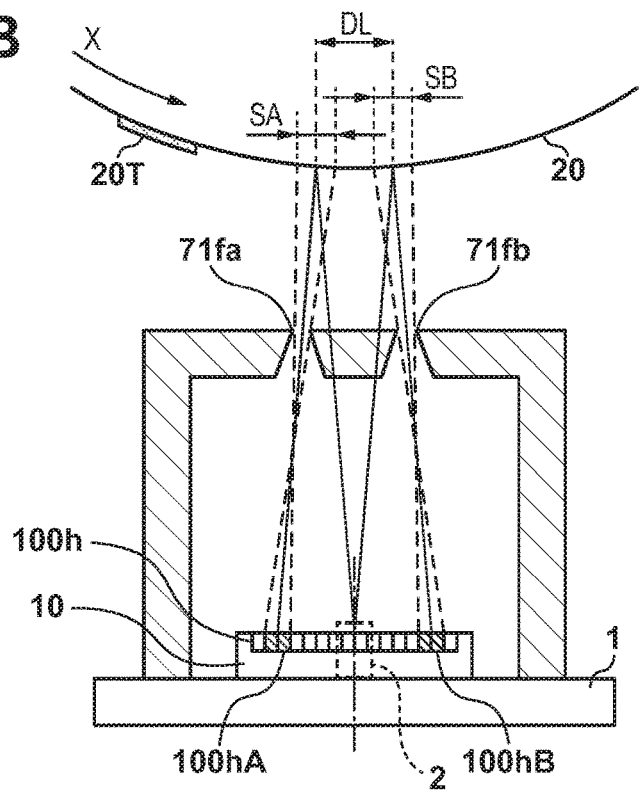

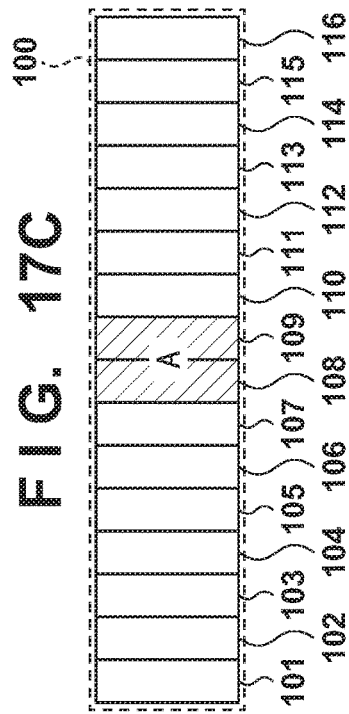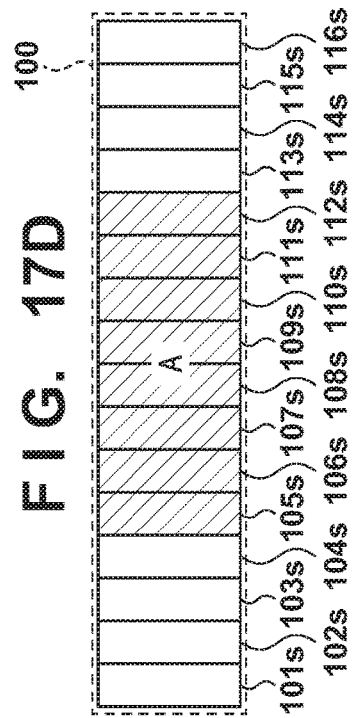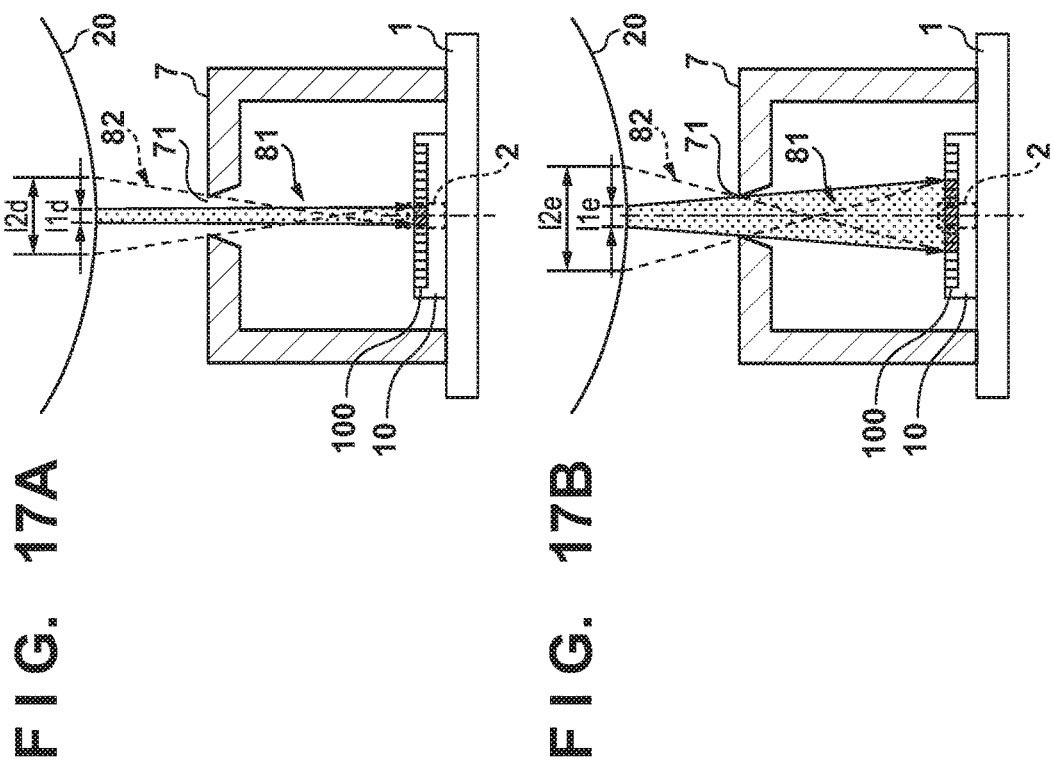

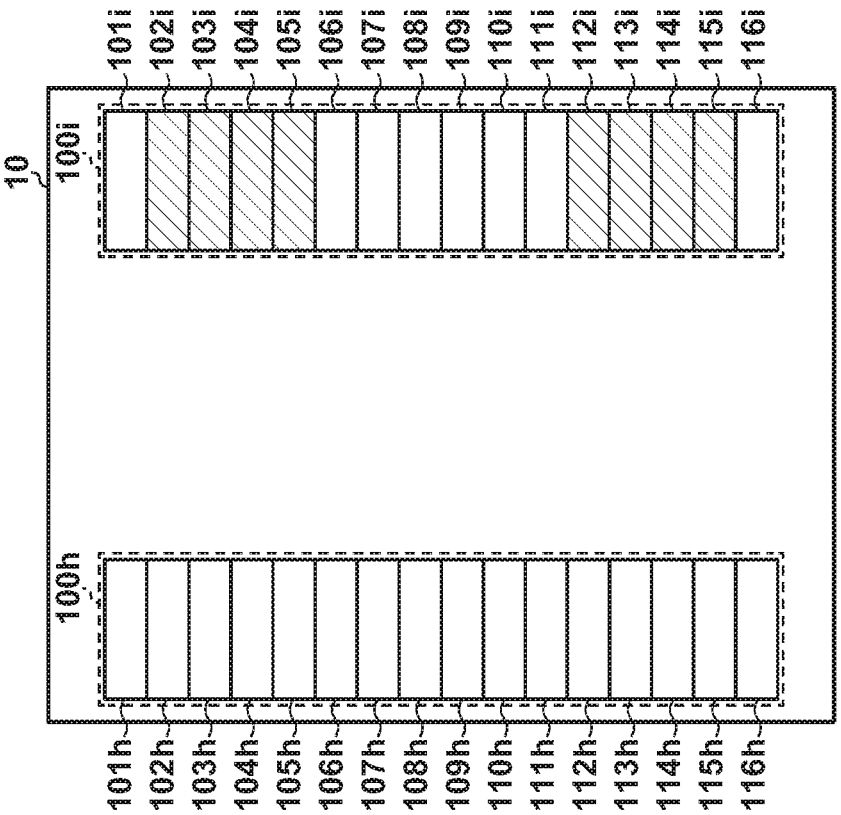
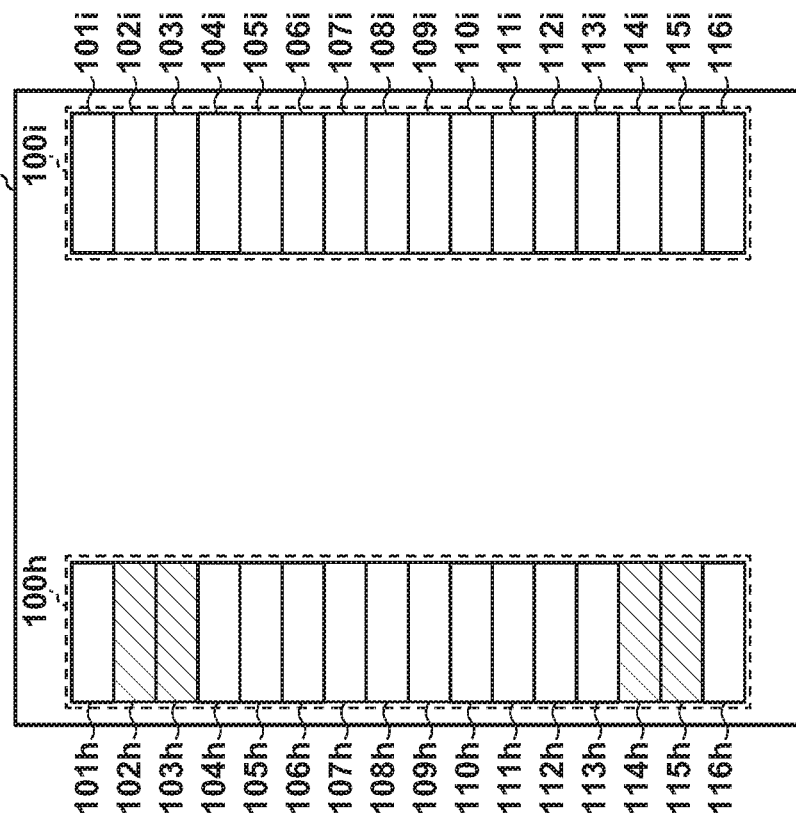

IMAGE FORMING APPARATUS AND OPTICAL SENSOR DETECTING TARGET FORMED ON IMAGE CARRIER OR RECORDING MEDIUM

BACKGROUND OF THE INVENTION

Field of the Invention

The present invention relates to image forming apparatuses such as color laser printers and color copiers, and optical sensors used in the image forming apparatuses and the like.

Description of the Related Art

An image forming apparatus performs misregistration correction control and density correction control in order to maintain the quality of an image to be formed. In order to perform these types of correction control, the image forming apparatus forms a detection image on an image carrier, and detects the detection image by using a reflection type optical sensor including one light-emitting element and two light-receiving elements. For example, Japanese Patent Laid-Open No. 2006-251686 discloses a configuration in which the same optical sensor is used in the misregistration correction control and the density correction control.

Also, the image forming apparatus forms an image on a recording material while conveying the recording material. Furthermore, the image forming apparatus includes members such as an intermediate transfer belt that are rotationally driven for forming images. The image forming apparatus also performs control such that the speed of a member that is conveyed or rotated at a predetermined speed is detected, and the fluctuation of the speed is suppressed. Accordingly, as a result of not only performing the misregistration correction control and the density correction control, but also detecting, with a common optical sensor, the speed, speed fluctuation, or the like of a member or the like that is conveyed or rotationally driven, the number of components can be reduced. Furthermore, in order to improve accuracy in each control, accuracy in detecting a misregistration amount, density, speed, and speed fluctuation that are detected by using the optical sensor needs to be improved. That is, detection accuracy of a target such as the detection image needs to be improved.

SUMMARY OF THE INVENTION

According to an aspect of the present invention, an image forming apparatus includes: a light-emitting unit configured to emit light toward an image carrier or a recording medium; a first light-receiving unit that includes a plurality of light-receiving elements arranged along a first direction that is a movement direction of a target formed on the image carrier or the recording medium, and is arranged so as to receive light emitted from the light-emitting unit and specularly reflected off the image carrier or the recording medium; an aperture stop member configured to limit a size of diffused reflection light that is incident on the first light-receiving unit in the first direction; a selection unit configured to select whether or not each of the plurality of light-receiving elements in the first light-receiving unit is a first effective light-receiving element; a generation unit configured to generate a first detection signal from an output of the first effective light-receiving element selected by the selection unit; and a detection unit configured to detect a target formed on the image carrier or the recording medium based on the first detection signal.

Further features of the present invention will become apparent from the following description of exemplary embodiments with reference to the attached drawings.

BRIEF DESCRIPTION OF THE DRAWINGS

FIGS. 13A and 13B are diagrams describing speed detection according to one embodiment.

FIGS. 15A and 15B are diagrams illustrating the optical sensor according to one embodiment.

FIGS. 17A to 17D are diagrams for illustrating effective light-receiving elements when misregistration amount detection and density detection are performed according to one embodiment.

FIGS. 21A and 21B are diagrams illustrating effective light-receiving elements when the speed detection is performed according to one embodiment.

DESCRIPTION OF THE EMBODIMENTS

Hereinafter, exemplary embodiments of the present invention will be described with reference to the drawings.

Note that the following embodiments are illustrative and do not limit the present invention to the contents of the embodiments. Also, in the following diagrams, constituent elements that are not required for describing the embodiments are omitted.

First Embodiment

Figure 7:
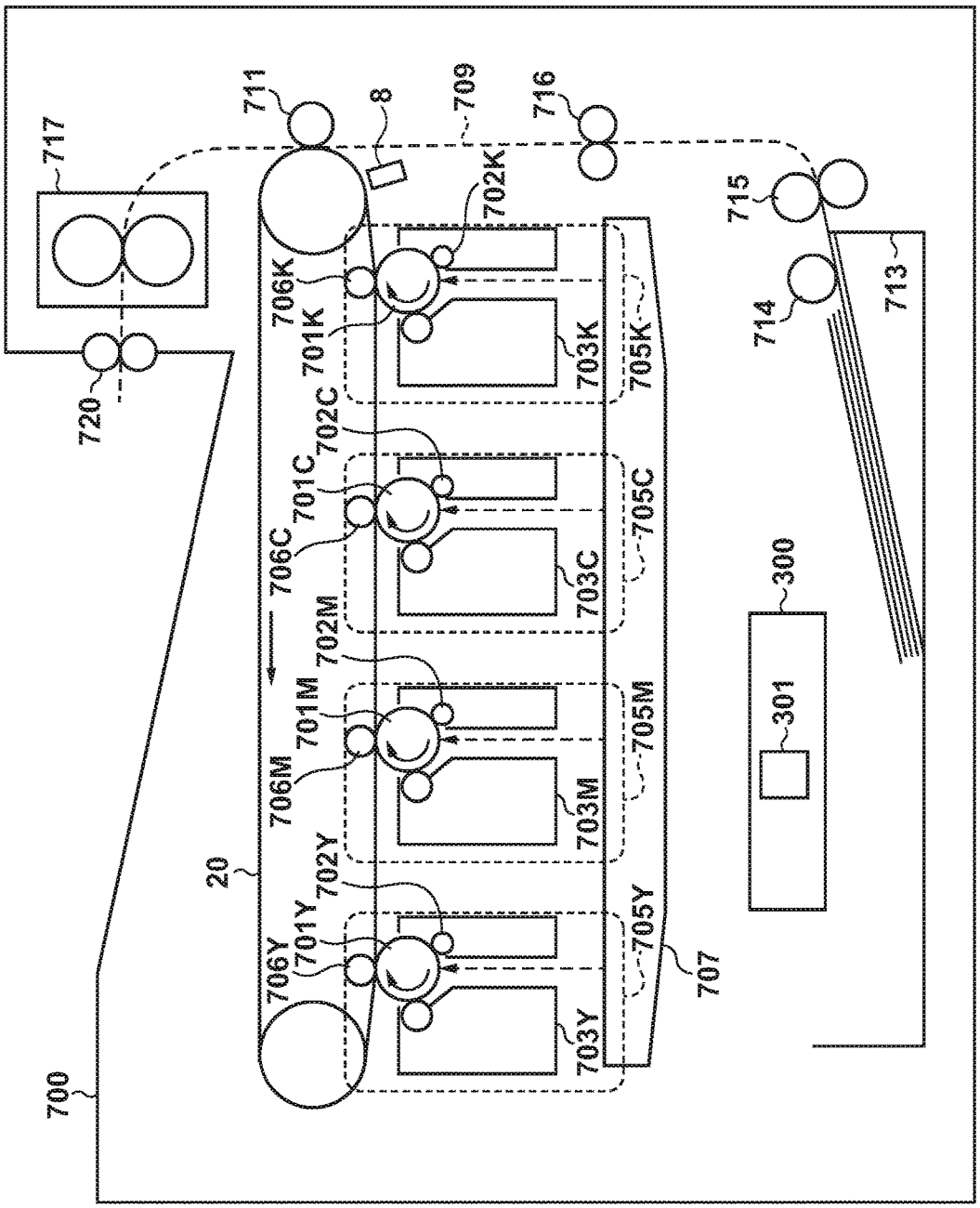
FIG. 7 is a configuration diagram of an image forming apparatus according to one embodiment.

FIG. 7 is a configuration diagram of an image forming apparatus 700 according to the present embodiment. Note that Y, M, C, and K at the end of reference signs respectively indicate that colors of toner images of which members denoted by these reference numerals are related to the forming are yellow, magenta, cyan, and black. Note that the following description will use reference signs without Y, M, C, and K at the end in cases where the colors do not need to be distinguished. A photosensitive member 701 in an image forming unit 705 is an image carrier, and is rotationally driven in the direction of the arrow when an image is formed. The charging unit 702 charges the surface of the photosensitive member 701 at a uniform potential. An exposure unit 707 forms an electrostatic latent image by scanning/exposing the surface of the photosensitive member 701 with light that corresponds to an image to be formed. A development unit 703 forms a toner image by developing the electrostatic latent image on the photosensitive member 701 by using toner. A primary transfer roller 706 transfers the toner image on the photosensitive member 701 to an intermediate transfer belt 20, which is an image carrier. Note that a full-color toner image is formed on the intermediate transfer belt 20 by transferring toner images of respective photosensitive members 701 to the intermediate transfer belt 20 so as to be overlaid thereon. The intermediate transfer belt 20 is rotationally driven in the direction of the arrow in the diagram when an image is formed. Accordingly, the toner image formed on the intermediate transfer belt 20 is conveyed to a position opposing a secondary transfer roller 711.

Meanwhile, a recording material in a cassette 713 is conveyed along a conveyance path 709 by conveyance rollers 714, 715, and 716 to the position opposing the secondary transfer roller 711. The secondary transfer roller 711 transfers the toner image on the intermediate transfer belt 20 to the recording material. The recording material to which the toner image has been transferred is heated and pressed in a fixing unit 717, and thus the toner image is fixed to the recording material. After the toner image has been fixed, the recording material is discharged to the outside of the apparatus by a conveyance roller 720. A control unit 300 includes a microcomputer 301, and performs control on various unshown drive sources of the image forming apparatus 700 and various types of control using a sensor and the like. Also, an optical sensor 8 is provided at a position opposing the intermediate transfer belt 20. In the present embodiment, the optical sensor 8 detects a detection image for detecting a misregistration amount and a detection image for detecting density, and outputs the detection results to the microcomputer 301. The microcomputer 301 performs misregistration correction control and density correction control based on the detection results. Note that, hereinafter, the direction in which the surface of the intermediate transfer belt 20 moves refers to a sub-scanning direction, and the direction orthogonal to the sub-scanning direction is referred to as a main-scanning direction.

Mechanical dimensions of the image forming apparatus 700 shift from the design values due to an error in assembly, component tolerance, thermal expansion of components, or the like, and thus relative positions of toner images formed by the respective image forming units 705 are shifted, and as a result misregistration occurs. In the misregistration correction control, write start positions of electrostatic latent images in the main-scanning direction and the sub-scanning direction and an image clock are adjusted such that the relative positional shifts of toner images of respective colors are made small based on a detection result of the detection image by the optical sensor 8. Also, in the image forming apparatus 700, the color tone, the density, or the like of an output image may change due to change over time or continuous printing. The density correction control is performed in order to correct this fluctuation. In the density correction control, detection images for detecting densities of respective colors are formed on the intermediate transfer belt 20 or the like, and the intensity of light reflected from the formed detection images are detected by the optical sensor 8. Then, the image forming condition is set based on the detection result. The density correction control is classified into maximum density control and tone control. The object of the maximum density control is to keep the color balance between the colors to be constant, and to prevent the toner from scattering when the toner images of the respective colors are overlaid and a fixing failure from occurring due to excessive toner being put on. On the other hand, the tone control is performed so as to prevent an unnatural image from being formed as a result of shifting of the output density relative to an input image signal due to a nonlinear input-output characteristic.

Figure 3A:
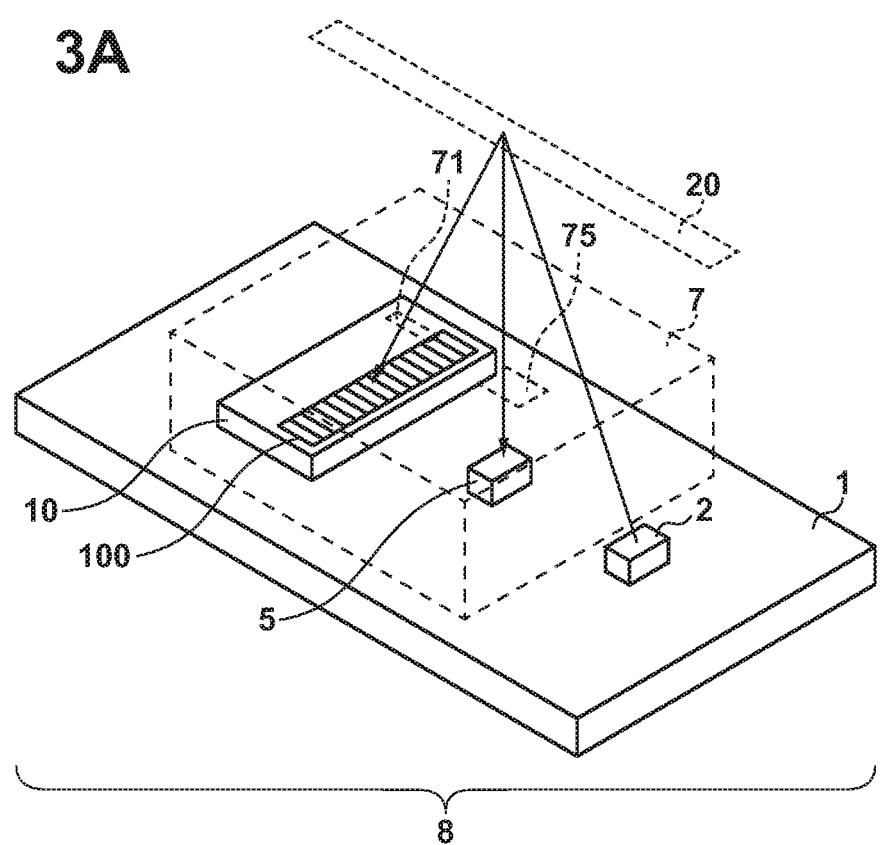
FIGS. 3A and 3B are diagrams illustrating the optical sensor according to one embodiment.
Figure 3B:
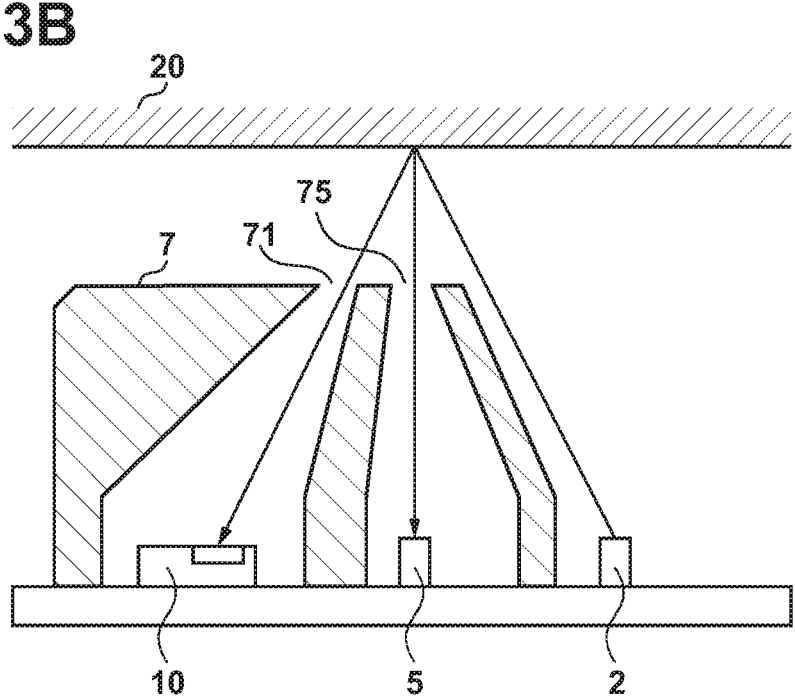
Figure 4:
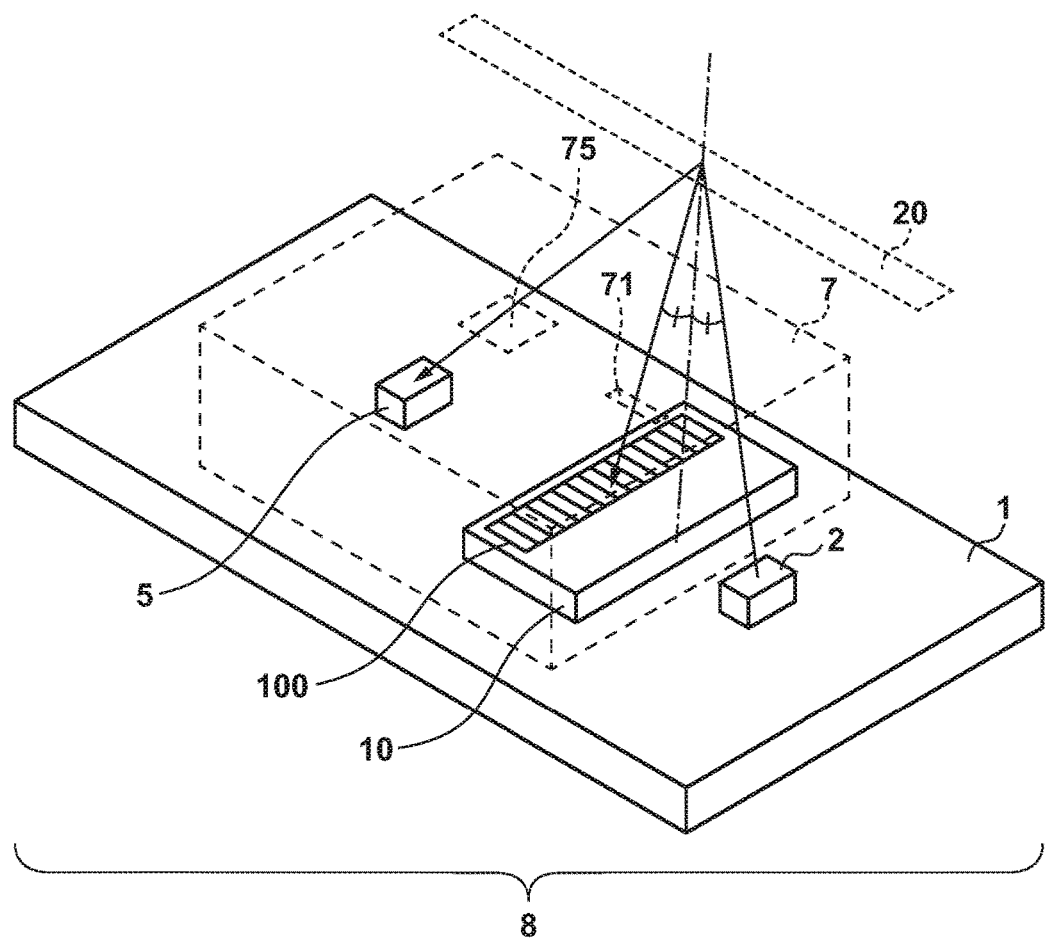
FIG. 4 is a diagram illustrating the optical sensor according to one embodiment.

FIG. 3A is a perspective view of the optical sensor 8 according to the present embodiment, and FIG. 3B is a cross-sectional view in the main-scanning direction of the optical sensor 8. The optical sensor 8 includes an LED 2, which is a light-emitting unit, a light-receiving element 5, which is a light-receiving unit, and an optical sensor IC 10 mounted on a printed board 1. In the present embodiment, the LED 2, the light-receiving element 5, and the optical sensor IC 10 are arranged along the main-scanning direction. Also, the optical sensor IC 10 includes a light-receiving element array 100, which is a light-receiving unit. The light-receiving element array 100 includes a plurality of light-receiving elements that are arranged along the sub-scanning direction. Furthermore, in the optical sensor 8 of the present embodiment, an aperture stop member 7, in which opening portions 71 and 75 for narrowing down light beam paths are formed, is attached to the printed board 1. The LED 2 is basically a diffusion emission type LED that does not include a lens or a reflection frame, and an opening portion for narrowing down a light beam path is not provided between the LED 2 and the intermediate transfer belt 20. Accordingly, light emitted from the LED 2 illuminates the intermediate transfer belt 20 over a wide range. Note that a configuration may be adopted in which an opening portion necessary for avoiding the influence of multiple reflections or the like of unnecessary light is provided between the LED 2 and the intermediate transfer belt 20. The light emitted by the LED 2 and reflected off the intermediate transfer belt 20 illuminates the optical sensor IC 10 via the opening portion 71, and illuminates the light-receiving element 5 via the opening portion 75. Here, in the present embodiment, the opening portion 71 and the light-receiving element array 100 are arranged so as to receive light that is specularly reflected off the intermediate transfer belt 20. On the other hand, the opening portion 75 and the light-receiving element 5 are arranged so as to not receive light that is specularly reflected off the intermediate transfer belt 20, that is, to receive light that is scatter-reflected off the intermediate transfer belt 20. The light-receiving element 5 and the light-receiving element array 100 output signals based on the amount of received light, and the microcomputer 301 performs various types of control based on these signals. Note that, in the optical sensor 8 shown in FIGS. 3A and 3B, the light-receiving element 5 is arranged in a position closer to the LED 2 than the light-receiving element array 100 is, but the light-receiving element array 100 may be arranged in a position closer to the LED 2, as shown in FIG. 4.

Figure 5A:
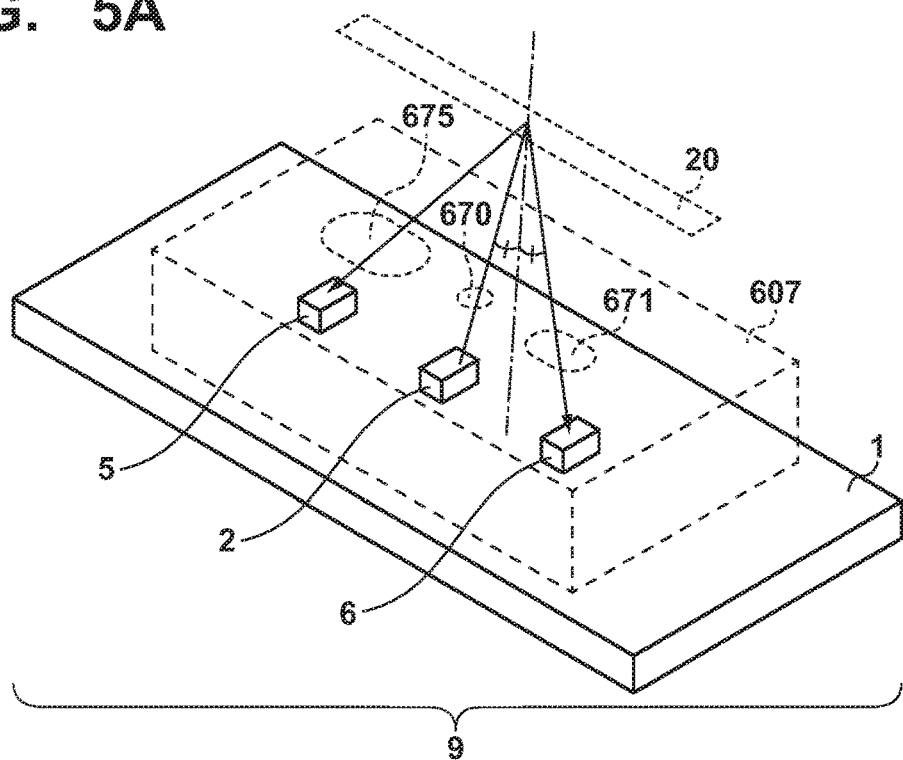
FIGS. 5A and 5B are diagrams illustrating an optical sensor.
Figure 5B:
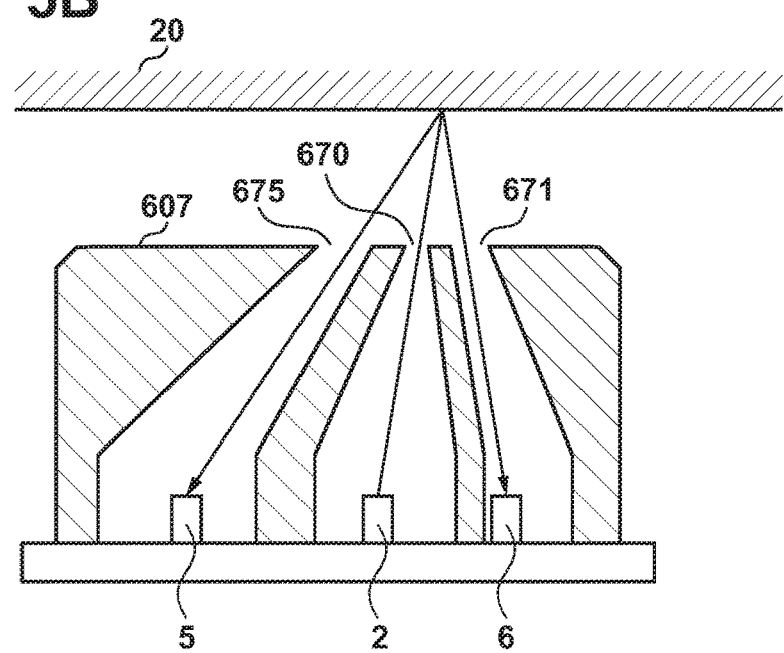

FIG. 5A is a perspective view of a conventional optical sensor 9, and FIG. 5B is a cross-sectional view in the main-scanning direction. The optical sensor 9 includes the LED 2, the light-receiving element 5, and the light-receiving element 6 mounted on the printed board 1. Furthermore, the optical sensor 9 is provided with an aperture stop member 607 in which opening portions 671, 675, and 670 for narrowing down light beam paths are formed. The light emitted from the LED 2 illuminates the intermediate transfer belt 20 via the opening portion 670. Then, the reflected light illuminates the light-receiving element 6 via the opening portion 671, and illuminates the light-receiving element 5 via the opening portion 675. Note that the opening portion 671 and the light-receiving element 6 are arranged so as to receive light emitted from the LED 2 and specularly reflected. On the other hand the opening portion 675 and the light-receiving element 5 are arranged so as to not receive light emitted from the LED 2 and specularly reflected, that is, to receive diffused reflection light.

The opening portion 670 is configured to narrow down light with which the LED 2 illuminates the intermediate transfer belt 20, and the opening portions 671 and 675 are configured to narrow down reflected light from the intermediate transfer belt 20. The opening portion 671 is formed to be small so as to suppress the diffused reflection light component. On the other hand, the opening portion 675 is made to be large such that scattered light is guided to the light-receiving element 5 as much as possible. In the optical sensor 9 in FIG. 5, the light beam paths of light that the light-receiving elements 5 and 6 receive essentially depend on the size of the opening portion 670. That is, the spatial resolution of the optical sensor 9 is mainly determined by the diameter of the opening portion 670. The configuration is such that light is narrowed down upstream in the light beam path, and therefore the influence of the mechanical tolerance increases. That is, when the opening portion 670 is made too small, difficult adjustment processes are required, resulting in a significant increase in cost.

On the other hand, the optical sensor 8 of the present embodiment shown in FIGS. 3A and 3B is configured such that light is narrowed down after being reflected off the intermediate transfer belt 20. Note that, normally, the detection target of the optical sensor 8 is formed on the intermediate transfer belt 20. That is, the detection target is a detection image that moves in the sub-scanning direction. Therefore, by increasing the spatial resolution of the optical sensor 8 in the sub-scanning direction, the detection accuracy at the detection timing of the detection image increases, and as a result, the position of the detection image can be accurately detected. Note that, in order to suppress fluctuation in signal amplitude due to surface unevenness of the intermediate transfer belt 20, and fluctuation in signal amplitude due to unevenness, dither, or the like of the toner image, the spatial resolution in the main-scanning direction may be low. In order to increase the spatial resolution in the sub-scanning direction, the width of light that illuminates the light-receiving element array 100 in the sub-scanning direction needs to be small. Therefore, the width of the opening portion 71 in the sub-scanning direction is made smaller than that of the opening portion 671 shown in FIG. 5. The opening portion 71 makes the width of specularly reflected light that passes therethrough in the sub-scanning direction small, and therefore the influence of mechanical tolerance increases. However, even if variance due to mechanical tolerance occurs, because the light-receiving element array 100 includes the plurality of light-receiving elements arranged along the sub-scanning direction, any of the light-receiving elements can receive the specularly reflected light. Therefore, an adjustment process in the manufacturing process such as adjustment of a tilt angle and a volume resistor that were required in the conventional optical sensor 9 can be omitted.

Also, because the spatial resolution of the optical sensor 8 of the present embodiment in the sub-scanning direction is high, the length of the detection image for the misregistration detection in the sub-scanning direction can be shortened. Note that, in the density correction control, in order to reduce a detection error due to non-uniformity of the detection image, the width of the detection image in the sub-scanning direction is formed to be large. Since the resolution of the optical sensor 8 in the sub-scanning direction is high, the optical sensor 8 can easily detect density fluctuation in the sub-scanning direction. The density is detected based on a detection voltage of the optical sensor 8. By integrating and averaging the detection voltage, the accuracy of the detection voltage increases, and as a result, the accuracy in detecting the density can be increased.

Figure 1:
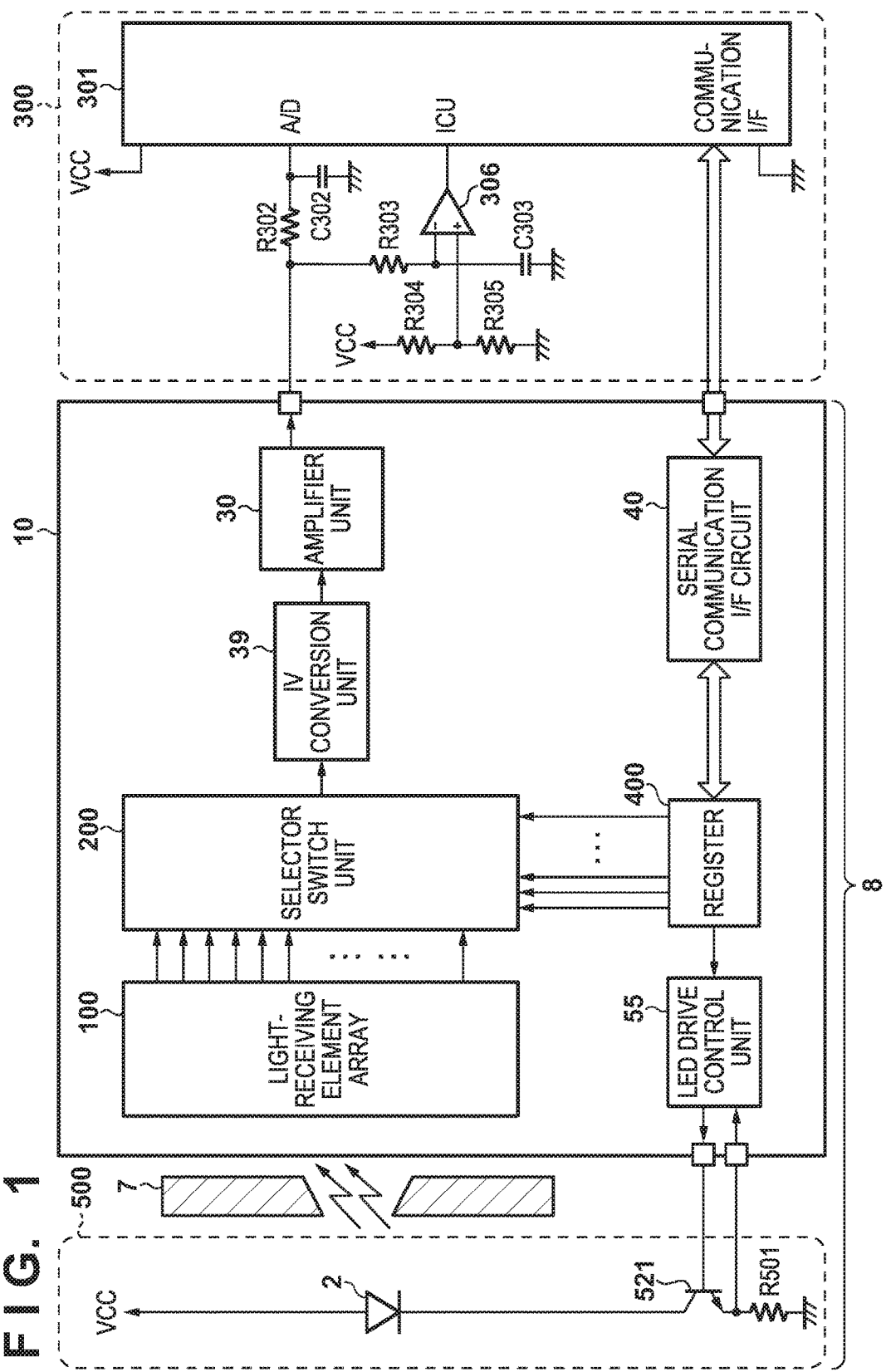
FIG. 1 is a configuration diagram of an optical sensor according to one embodiment.

FIG. 1 is a diagram for describing the configuration of the optical sensor 8. An LED drive control unit 55 in the optical sensor 8 outputs a drive signal to a transistor 521. When the transistor 521 is turned on by the drive signal, a current flows through the LED 2 and a resistor R501, and as a result, the LED 2 emits light. Also, the LED drive control unit 55 monitors the current flowing through the LED 2 and the resistor R501. The LED drive control unit 55 controls the light emission intensity of the LED 2 by controlling the drive signal such that the current becomes a target value. Also, a detection signal output from the optical sensor is input to an A/D port of the microcomputer 301 via a low pass filter constituted by a resistor R302 and a capacitor C302. In the density correction control, the microcomputer 301 detects the density of the detection image from the amplitude of the detection signal input to the A/D port. Also, the detection signal output from the optical sensor 8 is also input to a comparator 306 via a low pass filter constituted by a resistor R303 and a capacitor C303. The comparator 306 generates a binary signal by comparing a threshold voltage set by a resistor R304 and a resistor R305 and the detection signal, and inputs the binary signal to the microcomputer 301. The microcomputer 301 detects the position of the detection image in the misregistration correction control based on the timing of a rising edge and a falling edge of the binary signal. The microcomputer 301 is highly accurate in acquiring the edge timings, and has temporal resolution in the order of several 10s of nanoseconds. This corresponds to the detection image formed by toner being acquired with range resolution of less than one micron in terms of the length that the detection image passes above the optical sensor 8. Also, the control unit 300 outputs a control signal from a communication interface (communication I/F) of the microcomputer 301. The control signal is received by a serial communication I/F circuit 40 of the optical sensor 8, and a setting value that corresponds to the control signal is stored in a register 400.

The light emitted from the LED 2 and reflected off the intermediate transfer belt 20 illuminates the light-receiving element array 100. The light-receiving elements in the light-receiving element array 100 each output a current depending on an amount of received light, to a selector switch unit 200. The selector switch unit 200 outputs a sum of currents that have been output from the light-receiving elements indicated by the setting information in the register 400 to the IV conversion unit 39 as a current signal. The IV conversion unit 39 converts the input current signal to a voltage signal, thereby acting as a generation unit of a detection signal. An amplifier unit 30 amplifies the voltage signal and outputs the amplified signal as the detection signal. Hereinafter, one or more light-receiving elements that are connected to the IV conversion unit 39 by the selector switch unit 200 among the plurality of light-receiving elements in the light-receiving element array 100 are referred to as effective light-receiving elements. In the configuration of the present embodiment, different from a typical line sensor, only the output of the effective light-receiving elements is processed, and therefore the configuration is simplified.

Figure 2:
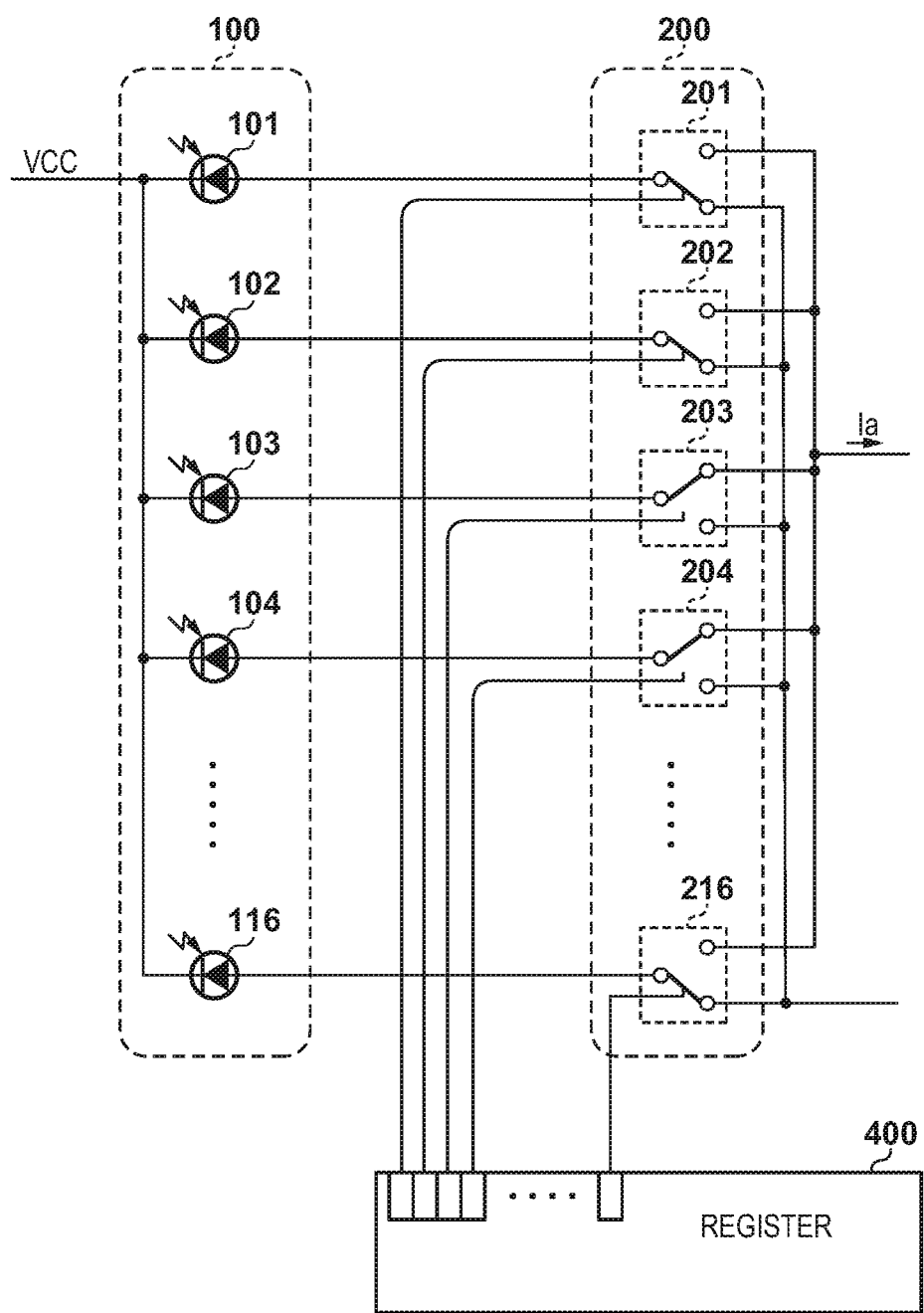
FIG. 2 is a configuration diagram of a light-receiving element array and a selector switch unit according to one embodiment.

FIG. 2 is an exemplary configuration of the light-receiving element array 100 and the selector switch unit 200. In the example in FIG. 2, the light-receiving element array 100 includes 16 light-receiving elements 101 to 116. Also, the selector switch unit 200 includes 16 switches 201 to 216 respectively corresponding to the light-receiving elements. Thus, the selector switch unit 200 is a switch configured by hardware. The register 400 stores pieces of selection information of the switches 201 to 216. The selection information is information indicating whether or not each switch in the selector switch unit 200 outputs the output of the corresponding light-receiving element to the IV conversion unit 39. Note that, although, in the present embodiment, the optical sensor 8 acquires the selection information from the control unit 300 in the image forming apparatus, a configuration may be adopted in which the selection information is acquired from an external apparatus. As shown in FIG. 2, the selector switch unit 200 outputs to the IV conversion unit 39 the sum of currents from the light-receiving elements that are output to the IV conversion unit 39, as a current Ia. Note that the outputs of light-receiving elements that are not output to the IV conversion unit 39 are connected to ground, for example. However, a configuration may be adopted in which the outputs of light-receiving elements that are not output to the IV conversion unit 39 are used for generating another detection signal.

In many cases, the optical sensor 8 has to be arranged in a position that is different from that of the microcomputer 301, in the image forming apparatus. Therefore, the number of signal lines that connect the microcomputer 301 and the optical sensor 8 is likely to be restricted from a viewpoint of cost and space. However, as a result of adopting serial communication between the microcomputer 301 and the optical sensor 8, the number of signal lines can be suppressed to about two to four. Also, because the register 400 and the selector switch unit 200 are configured inside the optical sensor IC 10, the optical sensor 8 can be greatly downsized.

Note that, although not shown in FIG. 1, the current that is output from the light-receiving element 5 and corresponds to the amount of received light is converted to a voltage in an IV conversion unit, the voltage is amplified by an amplifier unit, and then the amplified voltage is output to the microcomputer 301 as a detection signal. The input configuration of the detection signal to the microcomputer 301 can be similar to the input configuration of the detection signal that is output from the amplifier unit 30 in FIG. 1. That is, the control unit 300 detects the amplitude of the detection signal based on the light-receiving element 5, binarizes the detection signal by using a threshold value, and detects the timing of an edge thereof. Note that the portion in which the detection signal based on the light-receiving element 5 is binarized by using a threshold value, and detects the timing of an edge thereof can be omitted.

The control unit 300, in the case of performing density correction control, for example, forms detection images with each color at a plurality of densities on the intermediate transfer belt 20. The control unit 300 detects the density of each detection image by using the difference between the detection signal based on the light-receiving element array 100 and the detection signal based on the light-receiving element 5. The density of each detection image can be determined by the amount of specularly reflected light. That is, the density of each detection image can be determined by the level of the detection signal corresponding to the amount of specularly reflected light. Here, although the main component of reflected light that each light-receiving element of the light-receiving element array 100 receives is specularly reflected light, the reflected light includes a diffused reflection light component. Therefore, as a result of calculating a difference resulting from subtracting the detection signal based on the light-receiving element 5 from the detection signal based on the light-receiving element array 100, the diffused reflection light component included in the detection signal based on the light-receiving element array 100 is suppressed, and the density can be accurately detected. Note that the processing for obtaining the difference is performed by data processing in the microcomputer 301, in general. Also, because the detection target in the misregistration correction control is a relative positional shift between images of respective colors, the control can only be performed with the detection signal based on the light-receiving element array 100. That is, the detection signal based on the light-receiving element array 100 is binarized by a threshold value, the position of the detection image is determined, and the positional shift between colors can be determined. However, the edge position of the detection signal when binarized may change due to a diffused reflection light component included in the detection signal based on the light-receiving element array 100. Here, if the amounts of diffused reflection light for respective colors differ, the changes of the edge positions when the detection signals are binarized differ for respective colors, and as a result, the accuracy in detecting the misregistration amount deteriorates. Accordingly, similar to the detection of the density, the configuration may be such that misregistration of the detection image is obtained by binarizing the difference between the detection signal based on the light-receiving element array 100 and the detection signal based on the light-receiving element 5. Note that this difference can be obtained by inputting the detection signal based on the light-receiving element array 100 and the detection signal based on the light-receiving element 5 to a difference circuit constituted by an operational amplifier, for example.

Figure 6A:
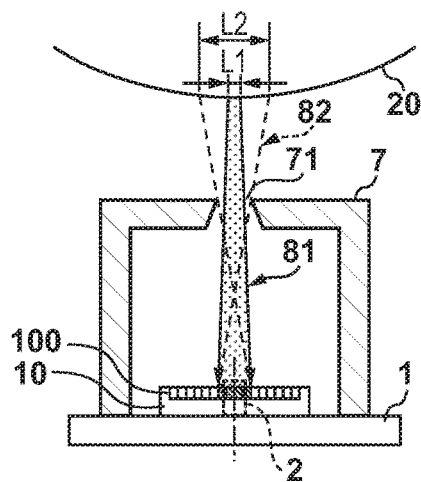
FIGS. 6A to 6F are diagrams for describing a method of selecting an effective light-receiving element in the optical sensor according to one embodiment.
Figure 6D:
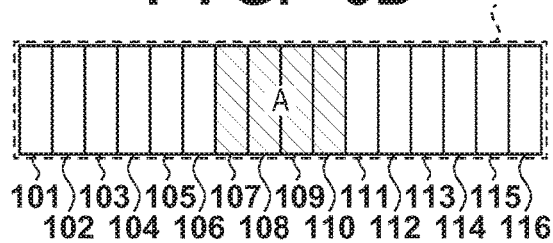
Figure 6B:
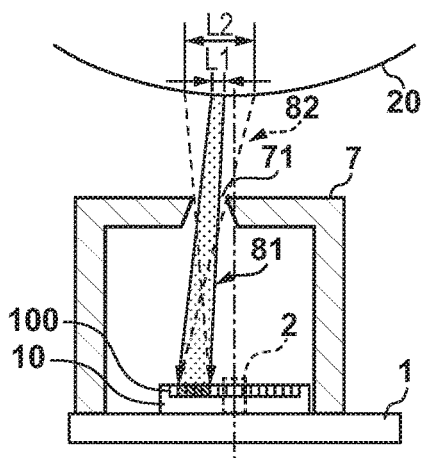
Figure 6E:
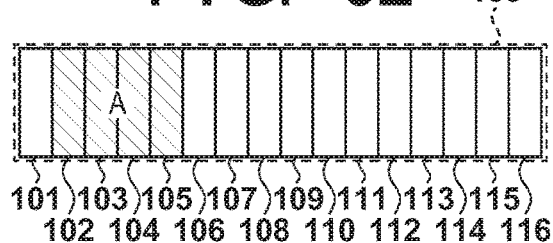
Figure 6C:
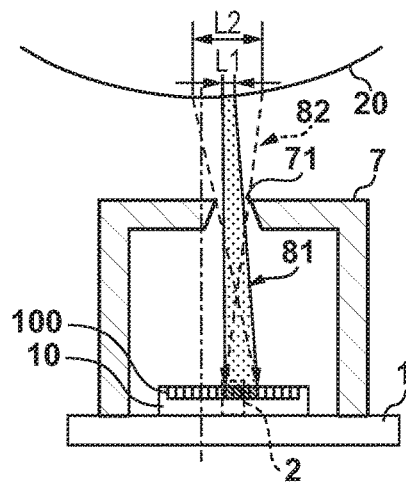

Next, a description will be given of the selection of the effective light-receiving elements in the misregistration correction control and the density correction control. FIGS. 6A to 6C are cross-sectional views of the optical sensor 8 in the sub-scanning direction. A curved portion of the intermediate transfer belt 20 is located so as to oppose the optical sensor 8. FIG. 6A shows a case where the optical sensor 8 is attached at an ideal position relative to the intermediate transfer belt 20, and the members of the optical sensor 8 are attached to respective ideal positions. In this case, the light-receiving elements 107 to 110, among the light-receiving elements 101 to 116 in the light-receiving element array 100, that are located at the central portion are selected as the effective light-receiving elements, for example. In FIG. 6D, the effective light-receiving elements in FIG. 6A are indicated by a shaded section A. Reference signs 82 and 81 in FIG. 6A respectively indicate the specularly reflected light and the diffused reflection light that are incident on the effective light-receiving elements.

In the example in FIG. 6A, the number of effective light-receiving elements is determined such that the width, in the sub-scanning direction, of the specularly reflected light that is incident on the effective light-receiving elements when passing through the opening portion 71 is smaller than the width of the opening portion 71 in the sub-scanning direction. In this case, a width L1, on the intermediate transfer belt 20, of the specularly reflected light that the effective light-receiving elements receive does not depend on the width of the opening portion 71 in the sub-scanning direction. On the other hand, a width L2, on the intermediate transfer belt 20, of the diffused reflection light 82 depends on the number of successive effective light-receiving elements and the width of the opening portion 71 in the sub-scanning direction. As described above, the number of effective light-receiving elements is set such that the width of the specularly reflected light that the optical sensor 8 receives in the sub-scanning direction does not depend on the opening portion 71. However, if the opening portion 71 does not exist, the diffused reflection light is not restricted, the diffused reflection light from a wide range is incident on the effective light-receiving elements, and as a result, the spatial resolution decreases. Accordingly, in order to improve the spatial resolution, narrowing of the opening portion 71 is needed. That is, the opening portion 71 is mainly for narrowing down the width of the diffused reflection light that is incident on the effective light-receiving elements, that is, the width thereof in the sub-scanning direction or the main-scanning direction, for example. Note that when the opening portion 71 is narrowed down, the influence of variation in the mechanical tolerance increases, as described above.

Figure 6F:
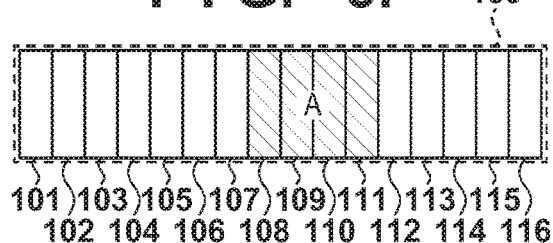

For example, a case is considered where the aperture stop member 7 is shifted to the left in the diagram from the ideal position, and thus the opening portion 71 is shifted from the ideal position, as shown in FIG. 7B. Due to the shift of the position of the opening portion 71 from the ideal position, the position of the specularly reflected light that illuminates the light-receiving element array 100 shifts. In this case, as shown in FIG. 6E, the light-receiving elements 102 to 105 are selected as the effective light-receiving elements, and as a result, the influence of the positional shift of the aperture stop member 7 can be absorbed. Also, FIG. 7C shows a case where the entire optical sensor 8 shifts to the right in the diagram from the ideal position. Note that the positional relationship of the members inside the optical sensor 8 is in an ideal state. In this case, as shown in FIG. 6F, the light-receiving elements 108 to 111 are selected as the effective light-receiving elements, and as a result, the influence of the positional shift of the aperture stop member 7 can be absorbed.

The microcomputer 301 sets selection information in the register 400 such that one of the light-receiving elements 101 to 116 is selected in order, and can measure the amount of received light of each of the light-receiving elements 101 to 116 one by one, for example. The microcomputer 301 can select one or more effective light-receiving elements so as to correct the mechanical shift based on the measurement result.

Note that, in FIGS. 6A to 6C, positions, on the intermediate transfer belt 20, of the reflection region of specularly reflected light that the effective light-receiving elements receive are different from each other. That is, in the present embodiment, the shift of an attachment position of the optical sensor 8 or the like is absorbed by changing the reflection position on the intermediate transfer belt 20, which is a merit of restricting the light beam path by the opening portion after reflection instead of before reflection.

Note that, although, in the present embodiment, the detection image formed on the intermediate transfer belt 20 is detected, the configuration may be such that a detection image formed on a recording medium such as paper is detected. Also, for example, there are cases where, in the image forming apparatus, a mark for indicating a reference position is formed on the surface of the intermediate transfer belt 20 in advance, and the reference position of the intermediate transfer belt 20 is detected based on the mark. The optical sensor 8 of the present embodiment can also be applied to the detection of the reference mark, and the reference mark can be made to be minute because of the high spatial resolution. Furthermore, in the image forming apparatus, the conveyance timing of a recording material or the like needs to be detected. An optical sensor having high spatial resolution needs to be used in order to improve the detection accuracy of the conveyance timing. The optical sensor 8 of the present embodiment can also be applied to the detection of a conveyed object such as a recording material.

Second Embodiment

Figure 8:
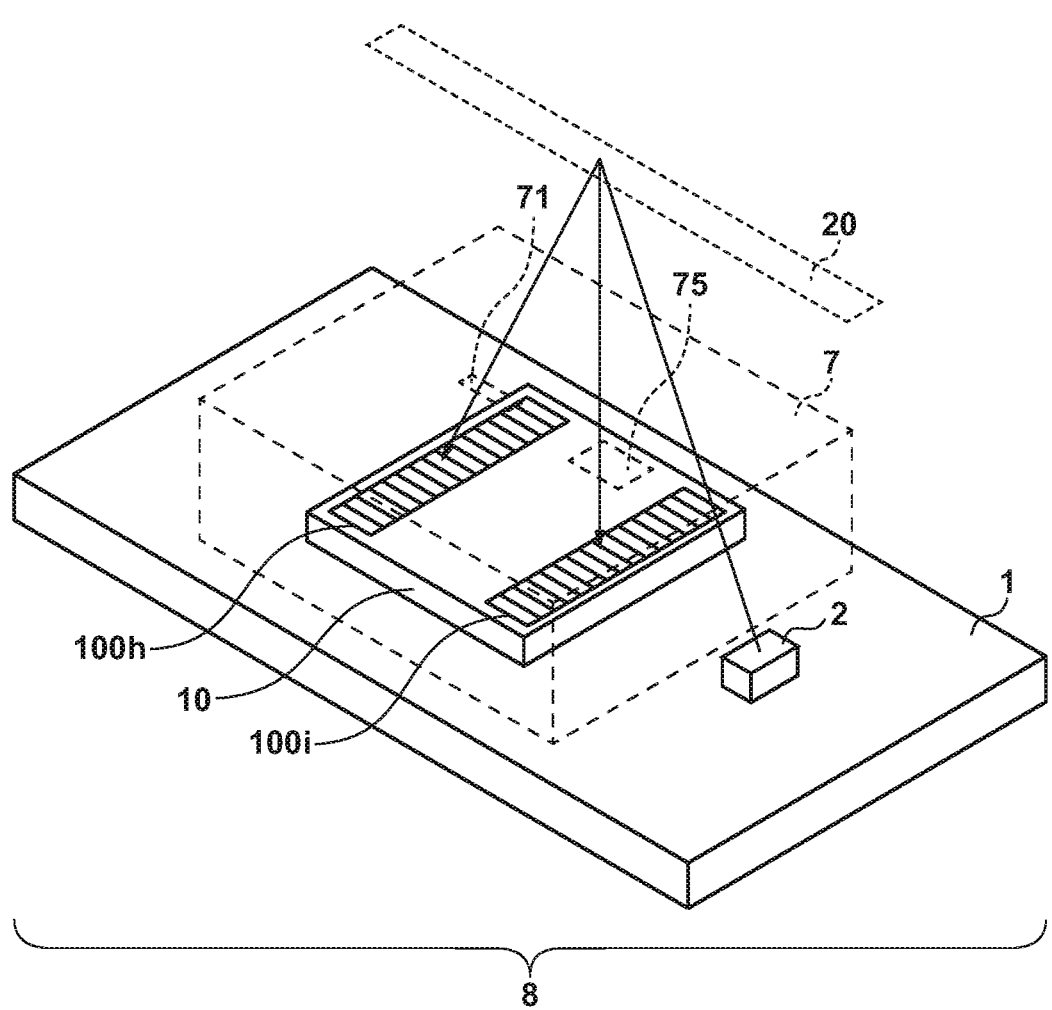
FIG. 8 is a diagram illustrating the optical sensor according to one embodiment.

Next, a second embodiment will be described with focus on differences from the first embodiment. FIG. 8 is a configuration diagram of the optical sensor 8 according to the present embodiment. The optical sensor 8 according to the present embodiment is provided with two light-receiving element arrays 100h and 100i on the optical sensor IC 10. The light-receiving element array 100h and the light-receiving element array 100i each include a plurality of light-receiving elements that are arranged along the sub-scanning direction. Note that the light-receiving element array 100h is arranged so as to receive light emitted by the LED 2 and specularly reflected, and the light-receiving element array 100i is arranged so as to receive light emitted by the LED 2 and scatter-reflected. That is, in the optical sensor 8 of the present embodiment, the light-receiving element 5 of the optical sensor 8 of the first embodiment is replaced by the light-receiving element array 100i.

Figure 9:
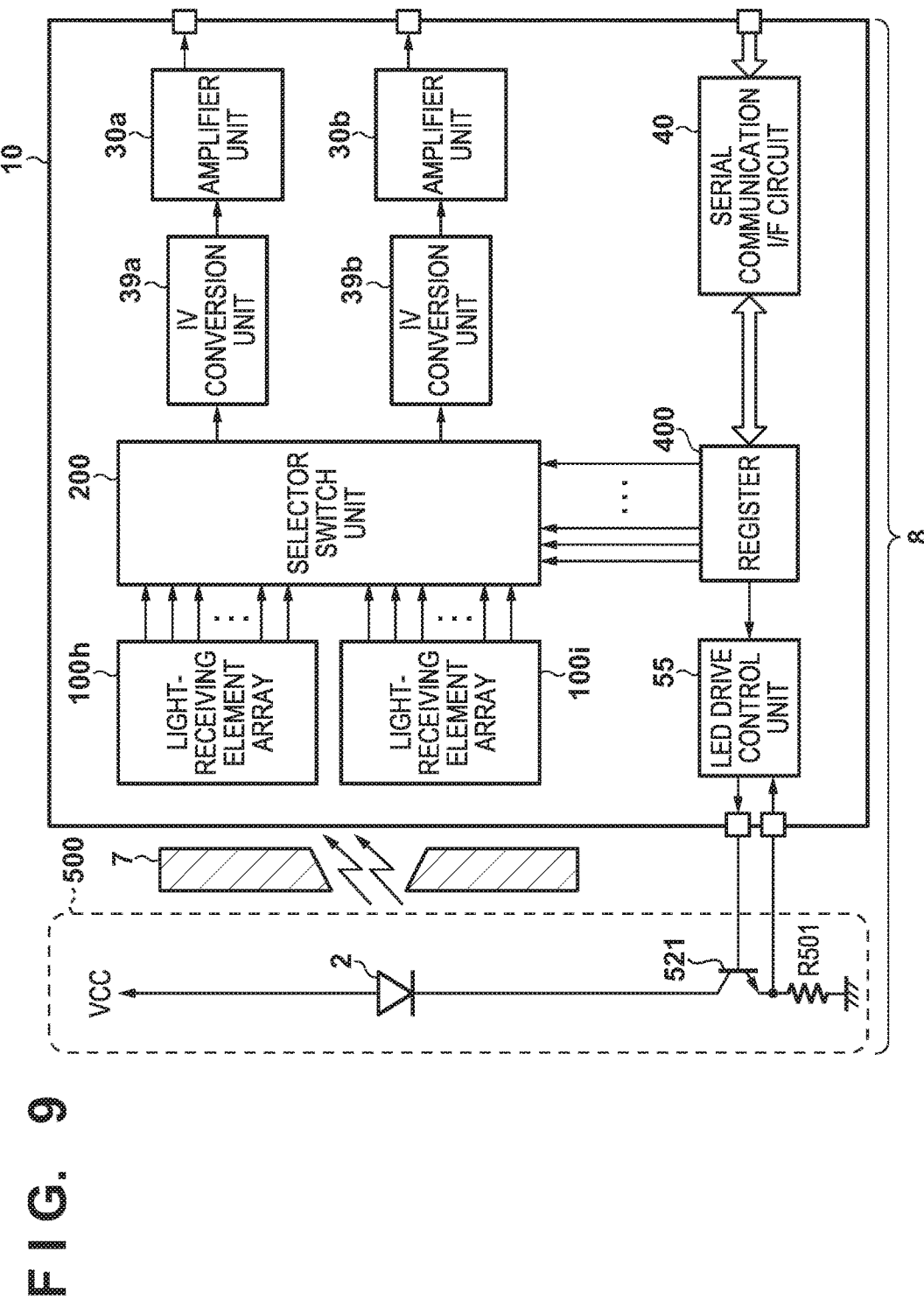
FIG. 9 is a configuration diagram of the optical sensor according to one embodiment.

FIG. 9 is a configuration diagram of the optical sensor 8 according to the present embodiment. Note that description of functional blocks similar to those described in the optical sensor 8 of the first embodiment shown in FIG. 1 is omitted. The current that depends on the amount of received light and is output from each of the light-receiving elements in the light-receiving element arrays 100h and 100i in the present embodiment is input to the selector switch unit 200. The selector switch unit 200 performs switching for each of the currents that are respectively output from the light-receiving elements, so as to select one out of the current being output to an IV conversion unit 39a, the current being output to an IV conversion unit 39b, and the current being output to neither of the IV conversion unit 39a nor the IV conversion unit 39b, according to the selection information set in the register 400, i.e., according to the mode. Note that the output destination of one light-receiving element is one, and the current therefrom is not output to the IV conversion unit 39a and the IV conversion unit 39b at the same time. The selector switch unit 200 outputs the sum of currents from all the light-receiving elements selected to be output to the IV conversion unit 39*a* to the IV conversion unit 39*a*. Also, the selector switch unit 200 outputs the sum of currents from all the light-receiving elements selected to be output to the IV conversion unit 39*b* to the IV conversion unit 39*b*. The IV conversion units 39*a* and 39*b* convert the current signals to respective voltage signals, and output the voltage signals to the amplifier units 30*a* and 30*b*, respectively, thereby each acting as a generation unit of a detection signal. The amplifier units 30*a* and 30*b* each amplify the input voltage signal, and output the amplified signal to the microcomputer 301 as the detection signal. Note that the reception configuration of the detection signals in the microcomputer 301 is similar to that of the first embodiment. That is, for each of the two detection signals, the amplitude thereof and the edge timing when the detection signal is binarized using a threshold are detected.

Figure 10:
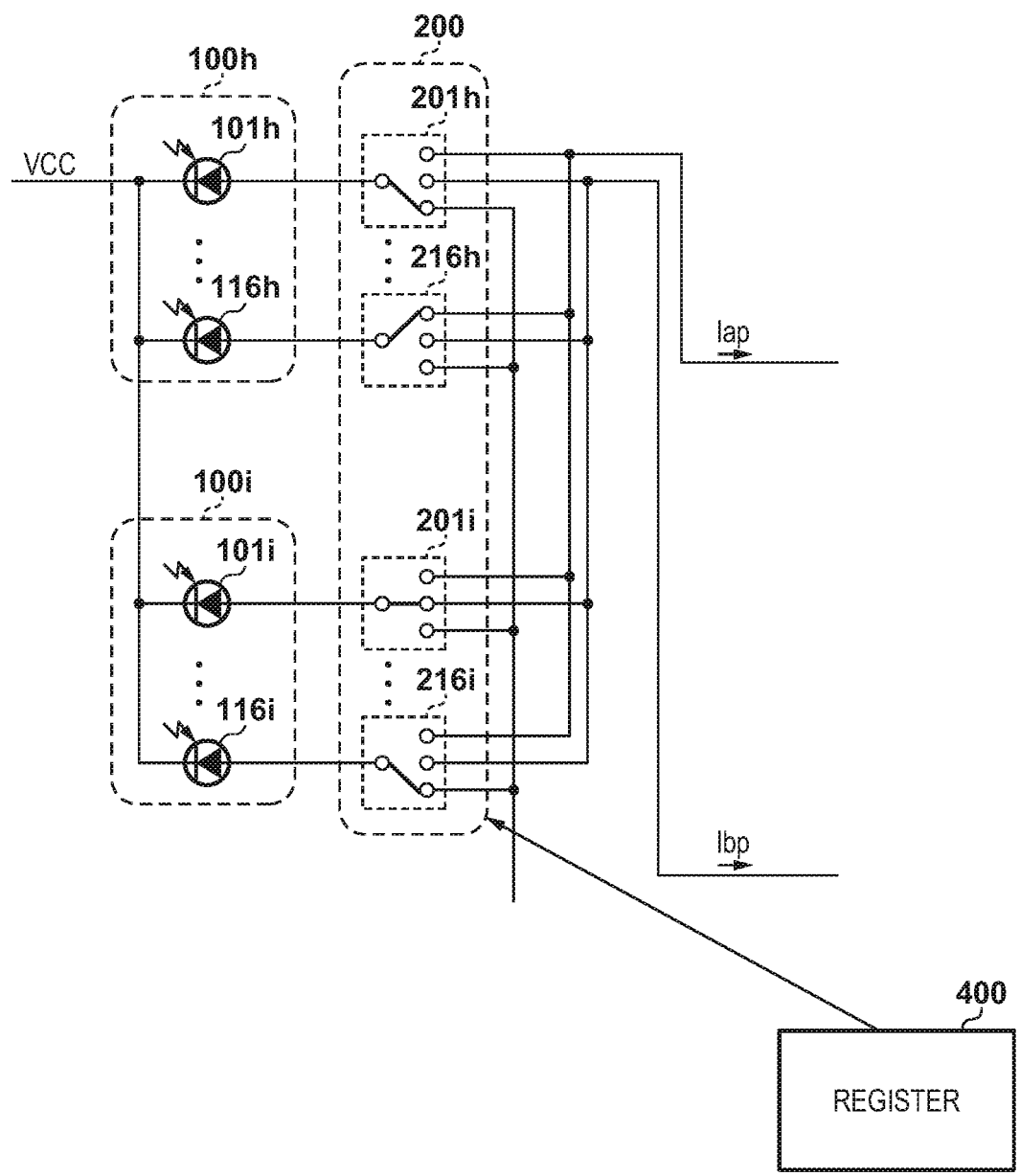
FIG. 10 is configuration diagram of a light-receiving element array and a selector switch unit according to one embodiment.

FIG. 10 is an exemplary configuration of the light-receiving element array 100*h*, the light-receiving element array 100*i*, and the selector switch unit 200. In the example in FIG. 10, the light-receiving element array 100*h* includes 16 light-receiving elements 101*h* to 116*h*, and the light-receiving element array 100*i* includes 16 light-receiving elements 101*i* to 116*i*. Also, the selector switch unit 200 includes 32 switches 201*h* to 216*h* and 201*i* to 216*i* that respectively correspond to the light-receiving elements. The register 400 stores selection information for each switch. The selection information is information for each switch indicating that the switch outputs the output of the corresponding light-receiving element to the IV conversion unit 39*a* or the IV conversion unit 39*b*, or that the switch does not output the output to either of the IV conversion units 39*a* and 39*b*. As shown in FIG. 10, the selector switch unit 200 outputs the sum of currents from the respective light-receiving elements that are output to the IV conversion unit 39*a* to the IV conversion unit 39*a* as a current Iap, and outputs the sum of currents from the respective light-receiving elements that are output to the IV conversion unit 39*b* to the IV conversion unit 39*b* as a current Ibp. Note that the current that is not output to either of the IV conversion unit 39*a* and the IV conversion unit 39*b* is guided to ground. Alternatively, the configuration may be such that another detection signal is generated based on the sum of a portion of the currents that are not output to either of the IV conversion unit 39*a* and the IV conversion unit 39*b*.

Next, the detection of the density in the density correction control using the optical sensor 8 according to the present embodiment will be described. The microcomputer 301 determines the density of a detection image based on the amount of specularly reflected light from the detection image formed on the intermediate transfer belt 20. However, the reflected light received by each light-receiving element in the light-receiving element array 100*h* includes diffused reflection light as well. Accordingly, the diffused reflection light component included in the detection signal from the light-receiving element array 100*h* needs to be removed. For this reason, the amount of received light of the light-receiving element array 100*i* is used. For example, as shown by a shaded section A in FIG. 11, effective light-receiving elements are selected from the light-receiving element array 100*h*, and the outputs of the selected effective light-receiving elements are connected to the IV conversion unit 39*a*. Also, as shown by a shaded section B in FIG. 11, similarly, effective light-receiving elements are selected from the light-receiving element array 100*i*, and the outputs of the selected effective light-receiving elements are connected to the IV conversion unit 39*b*. The microcomputer 301 calculates the density of the detection image based on the difference between the detection signal generated from outputs of the effective light-receiving elements in the light-receiving element array 100*h* and the detection signal generated from outputs of the effective light-receiving elements in the light-receiving element array 100*i*. Here, the signal S/N ratio can be improved by setting the light-receiving element in which the amplitude of the detection signal therefrom is large as the effective light-receiving element.

Figure 12:
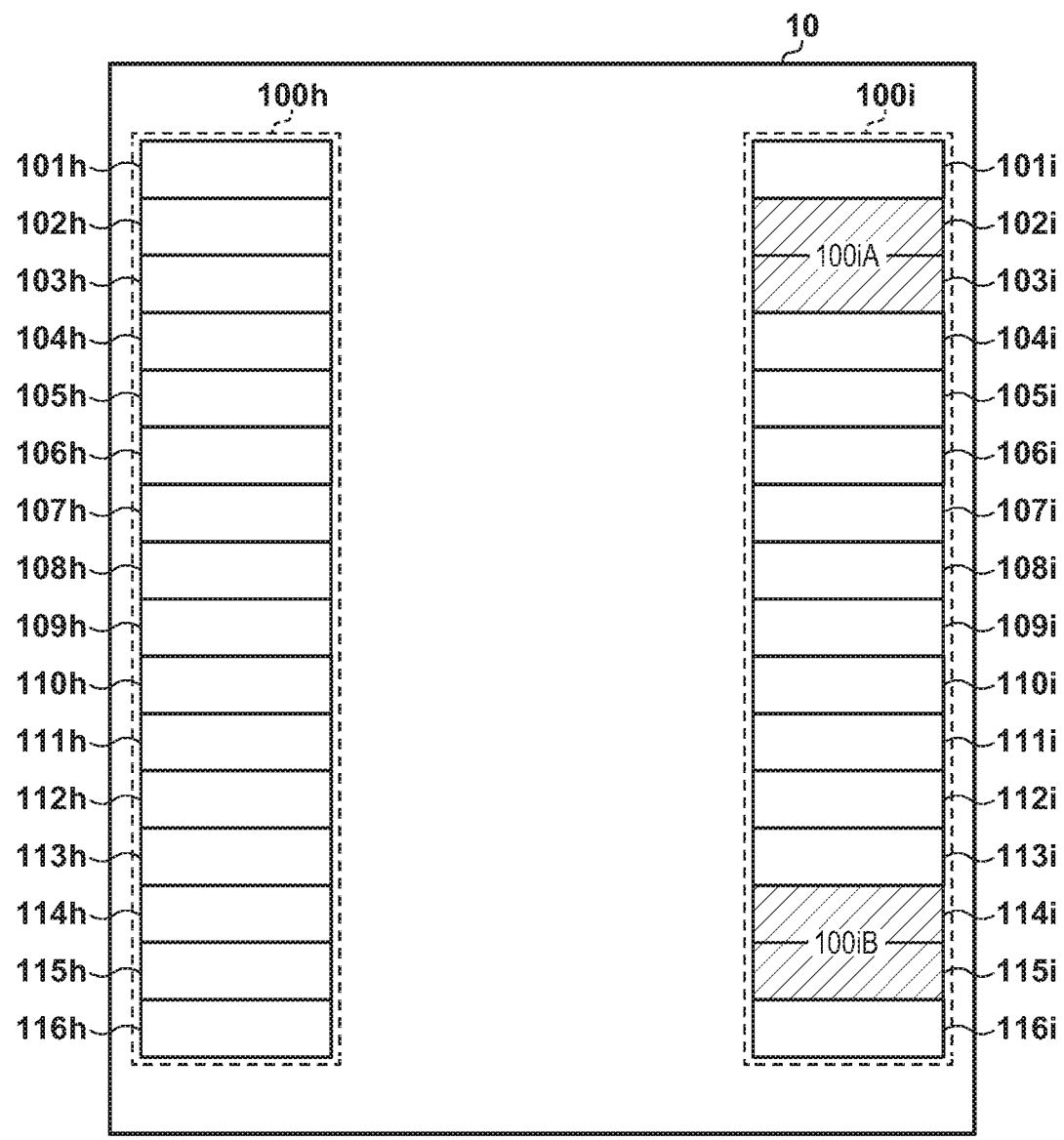
FIG. 12 is a diagram illustrating effective light-receiving elements when speed detection is performed according to one embodiment.

Next, a method of detecting the surface speed of the intermediate transfer belt 20 using the optical sensor 8 of the present embodiment will be described. First, a shaded section 100*i*A and a shaded section 100*i*B shown in FIG. 12 are selected as the effective light-receiving elements. Note that the effective light-receiving elements indicated by the shaded section 100*i*A are connected to the IV conversion unit 39*a*, and the effective light-receiving elements indicated by the shaded section 100*i*B are connected to the IV conversion unit 39*b*. Hereinafter, the detection signal based on the effective light-receiving elements indicated by the shaded section 100*i*A is referred to as a detection signal A, and the detection signal based on the effective light-receiving elements indicated by the shaded section 100*i*B is referred to as a detection signal B.

A detection target 20T is formed on the intermediate transfer belt 20, in advance, as shown in FIG. 13A. Note that the detection target 20 may be a toner image, or a mark that is provided in a fixed manner. The detection target 20T moves in the movement direction of the surface of the intermediate transfer belt 20, as shown by arrow X in FIG. 13A. The effective light-receiving elements 100*i*A receive reflected light from a reflection region SA on the intermediate transfer belt 20 via the opening portion 75, and the effective light-receiving elements 100*i*B receive reflected light from a reflection region SB on the intermediate transfer belt 20 via the opening portion 75. A section DL corresponds to the distance between the center position of the reflection region SA and the center position of the reflection region SB. The upper diagram in FIG. 13B is an exemplary waveform of the detection signal A subjected to binarization using a threshold value, and the lower diagram is an exemplary waveform of the detection signal B subjected to binarization using a threshold value. In FIG. 13B, the detection signal is at a high level when reflected light from the surface of the intermediate transfer belt 20 is detected, and the detection signal is at a low level when reflected light from the detection target 20T is received. The detection target 20T passes the reflection region SA after having passed the reflection region SB. Therefore, the detection timing of the detection target 20T based on the detection signal A is later than the detection timing of the detection target 20T based on the detection signal B by a time DT. Because the distance of section DL is already known from the positional relationship of the selected effective light-receiving elements, the microcomputer 301 can calculate the speed of the intermediate transfer belt 20 from the time DT. Also, by repeating the detection of speed, the speed fluctuation of the intermediate transfer belt 20 can be detected as well. Note that, for example, the effective light-receiving elements that generate the detection signal A and the effective light-receiving elements that generate the detection signal B may also be selected from different light-receiving element arrays. However, as shown in the present embodiment, as a result of selecting the effective light-receiving elements that generate the detection signal A and the effective light-receiving elements that generate the detection signal B from the same light-receiving element array, light conditions in the main-scanning direction are maintained, and the detection accuracy increases.

Figure 16A:
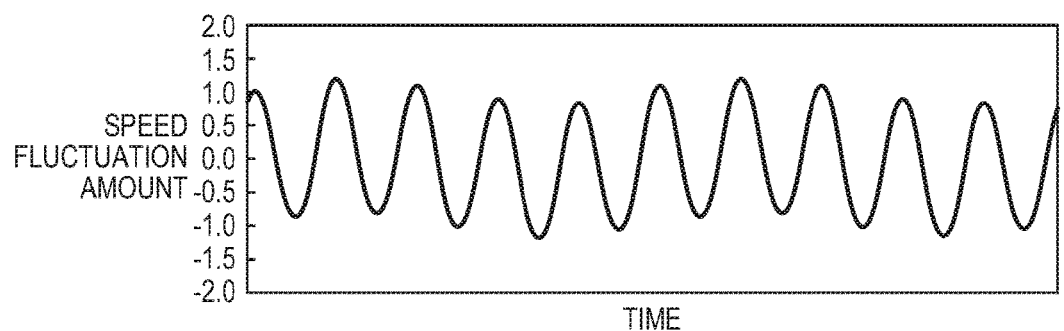
FIGS. 16A to 16C are diagrams illustrating speed fluctuation according to one embodiment.
Figure 16B:
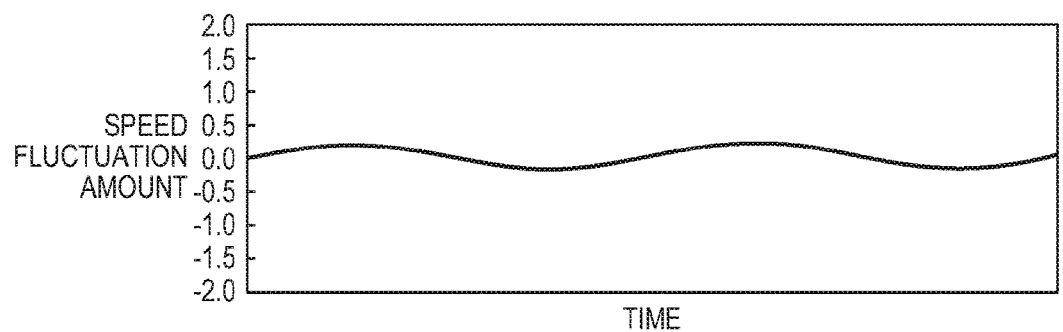
Figure 16C:
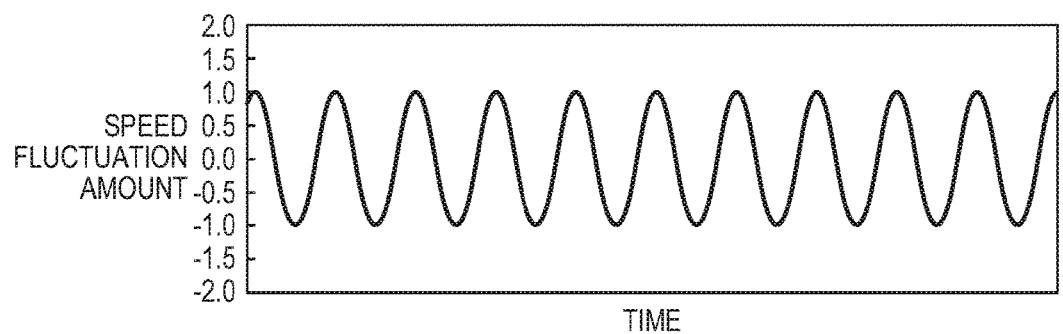

Here, the speed fluctuation of the intermediate transfer belt 20 is mainly caused by fluctuation in the thickness of the intermediate transfer belt 20 (hereinafter referred to as thickness fluctuation) and the eccentricity of a drive roller that drives the intermediate transfer belt 20 (hereinafter referred to as roller eccentricity). FIG. 16B shows the speed fluctuation due to thickness fluctuation, FIG. 16C shows the speed fluctuation due to roller eccentricity, and FIG. 16A shows the sum of the two types of speed fluctuation due to thickness fluctuation and roller eccentricity. In general, the speed fluctuation due to roller eccentricity is larger than the speed fluctuation due to thickness fluctuation. However, the misregistration caused by the speed fluctuation due to roller eccentricity can be cancelled out by making the distances between the photosensitive members integral multiples of the circumference of the drive roller. Therefore, if the speed fluctuation due to thickness fluctuation is suppressed, the misregistration caused by the speed fluctuation of the intermediate transfer belt 20 can be suppressed.

In order to suppress the speed fluctuation due to thickness fluctuation, a plurality of thin lines each extending along the main-scanning direction are formed on the intermediate transfer belt 20 along the sub-scanning direction, for example. Note that the width of each thin line in the sub-scanning direction is a width that can be detected by the optical sensor 8. The speed of the intermediate transfer belt 20 is obtained using each thin line as the detection target 20T, and thus the speed fluctuation of the intermediate transfer belt 20 is obtained. Speed fluctuation components due to roller eccentricity can be removed from the detected speed fluctuation by obtaining a moving average of the detected speed fluctuation in units of a cycle of the drive roller, and therefore the speed fluctuation due to thickness fluctuation can be detected. As a result of performing feedback control on a drive motor that drives the intermediate transfer belt 20 based on the detected speed fluctuation due to thickness fluctuation, the speed fluctuation due to thickness fluctuation can be suppressed. Accordingly, the speed fluctuation due to thickness fluctuation can be suppressed, and thus misregistration caused by the thickness fluctuation can be suppressed.

Figure 14A:
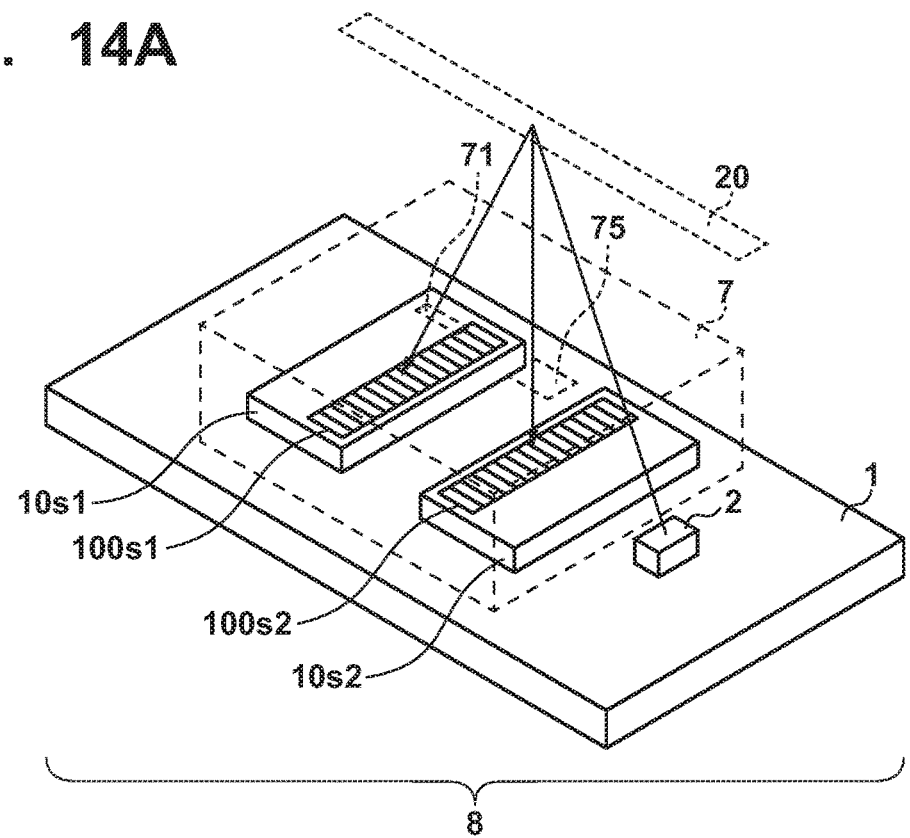
FIGS. 14A and 14B are diagrams illustrating the optical sensor according to one embodiment.
Figure 14B:
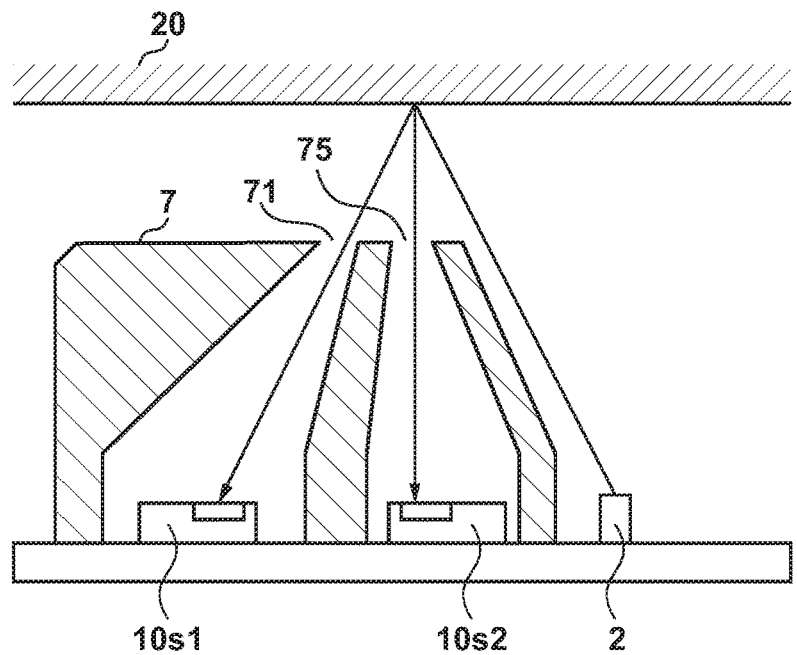

Note that, in the optical sensor 8 according to the present embodiment, the two light-receiving element arrays 100h and 100i are provided for one optical sensor IC 10. However, as shown in FIGS. 14A and 14B, the configuration may be such that two optical sensors IC, each including one light-receiving element array, are used. In FIGS. 14A and 14B, an optical sensor IC 10s1 including a light-receiving element array 100s1 and an optical sensor IC 10s2 including a light-receiving element array 100s2 are used. Note that FIG. 14A is a perspective view and FIG. 14B is a cross-sectional view in the main-scanning direction. It should be noted that, although, in FIG. 8 and FIGS. 14A and 14B, the light-receiving element array that receives diffused reflection light is arranged further on the LED 2 side than the light-receiving element array that receives specularly reflected light, the arrangement may be reversed.

Also, the moving speed of the intermediate transfer belt 20 can also be detected by the specularly reflected light instead of the diffused reflection light. For example, as shown in FIGS. 15A and 15B, two opening portions 71fa and 71fb are provided with respect to the light-receiving element array 100h. As shown in FIG. 15B, the reflected light that has been specularly reflected off a reflection region SA is received by effective light-receiving elements 100hA via the opening portion 71fa, and the reflected light that has been specularly reflected off a reflection region SB is received by effective light-receiving elements 100hB via the opening portion 71fb. Note that the effective light-receiving elements 100hA and 100hB are light-receiving elements in the light-receiving element array 100h. The target 20T passes through the reflection region SB after having passed through the reflection region SA. Therefore, the timing of a detection signal based on the effective light-receiving elements 100hA when detecting the target 20T is different from the timing of a detection signal based on the effective light-receiving elements 100hB when detecting the target 20T. The speed of the intermediate transfer belt 20 can be obtained from the difference in the timings of detection signals, and the distance DL.

Third Embodiment

Next, the present embodiment will be described with focus on differences from the first embodiment or the second embodiment. First, the method of detecting the misregistration amount in the misregistration correction control and the density in the density correction control, using the optical sensor 8 of the first embodiment shown in FIGS. 3A and 3B and FIG. 4 will be described. The detection of the misregistration amount and the density is performed using the output of the light-receiving element array 100 while a detection image passes through an illumination region on the intermediate transfer belt 20 by the LED 2. The light-receiving elements selected as the effective light-receiving elements in the misregistration amount detection and in the density detection are respectively shown by shaded sections A in FIGS. 17C and 17D. Also, FIGS. 17A and 17B are respectively cross-sectional views of the optical sensor 8 in the sub-scanning direction in the misregistration amount detection and in the density detection. A region 11d in FIG. 17A is a reflection region of the specularly reflected light received by the effective light-receiving elements, on the intermediate transfer belt 20, and a region 12d is a reflection region of the diffused reflection light received by the effective light-receiving elements, on the intermediate transfer belt 20. Similarly, a region 11e in FIG. 17B is a reflection region of the specularly reflected light received by the effective light-receiving elements, on the intermediate transfer belt 20, and a region 12e is a reflection region of the diffused reflection light received by the effective light-receiving elements, on the intermediate transfer belt 20. As is evident from FIGS. 17A and 17B, because the number of effective light-receiving elements when density is detected is larger than the number of effective light-receiving elements when a color shift amount is detected, the regions 11e and 12e are respectively larger than the regions 11d and 12d in the sub-scanning direction.

Figure 18A:
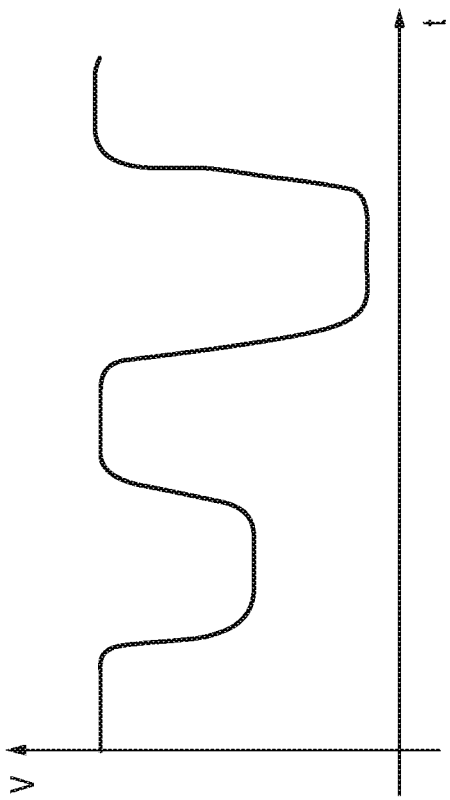
FIG. 18A is a diagram illustrating a detection signal when the misregistration amount detection is performed according to one embodiment.
Figure 18B:
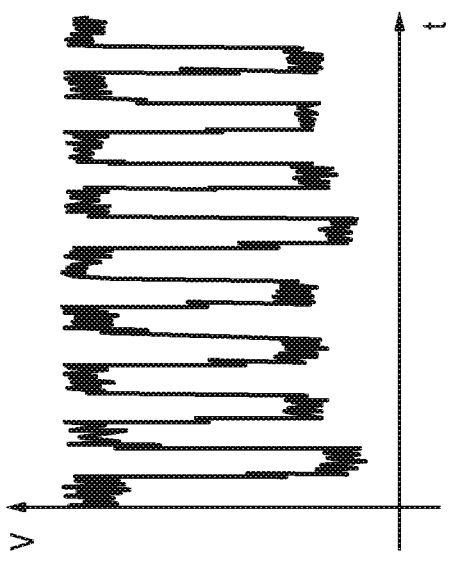
FIG. 18B is a diagram illustrating a detection signal when the density detection is performed according to one embodiment.

FIG. 18A shows a detection signal at the time of the misregistration amount detection, and FIG. 18B shows a detection signal at the time of the density detection. As shown in FIG. 18A, since the number of effective light-receiving elements at the time of detecting the misregistration amount is set to be small, rising edges and falling edges in the signal waveform can be accurately detected. On the other hand, at the time of the density detection, as a result of setting the number of effective light-receiving elements to be large, the resolution is lowered, the influence of noise is reduced, and the analog signal for the density detection can be accurately detected.

As described above, as a result of suppressing the influence of diffused reflection light with the opening portion 71, and changing the width of reflection region of specularly reflected light by changing the number of effective light-receiving elements, the detection of a misregistration amount based on edges in a signal waveform and the detection of density based on an amplitude can be accurately performed. Note that, although, in the present embodiment, the misregistration amount and the density are detected using a specularly reflected light component, a configuration may be adopted in which the misregistration amount and the density are detected using a diffused reflection light component.

Fourth embodiment

Figure 11:
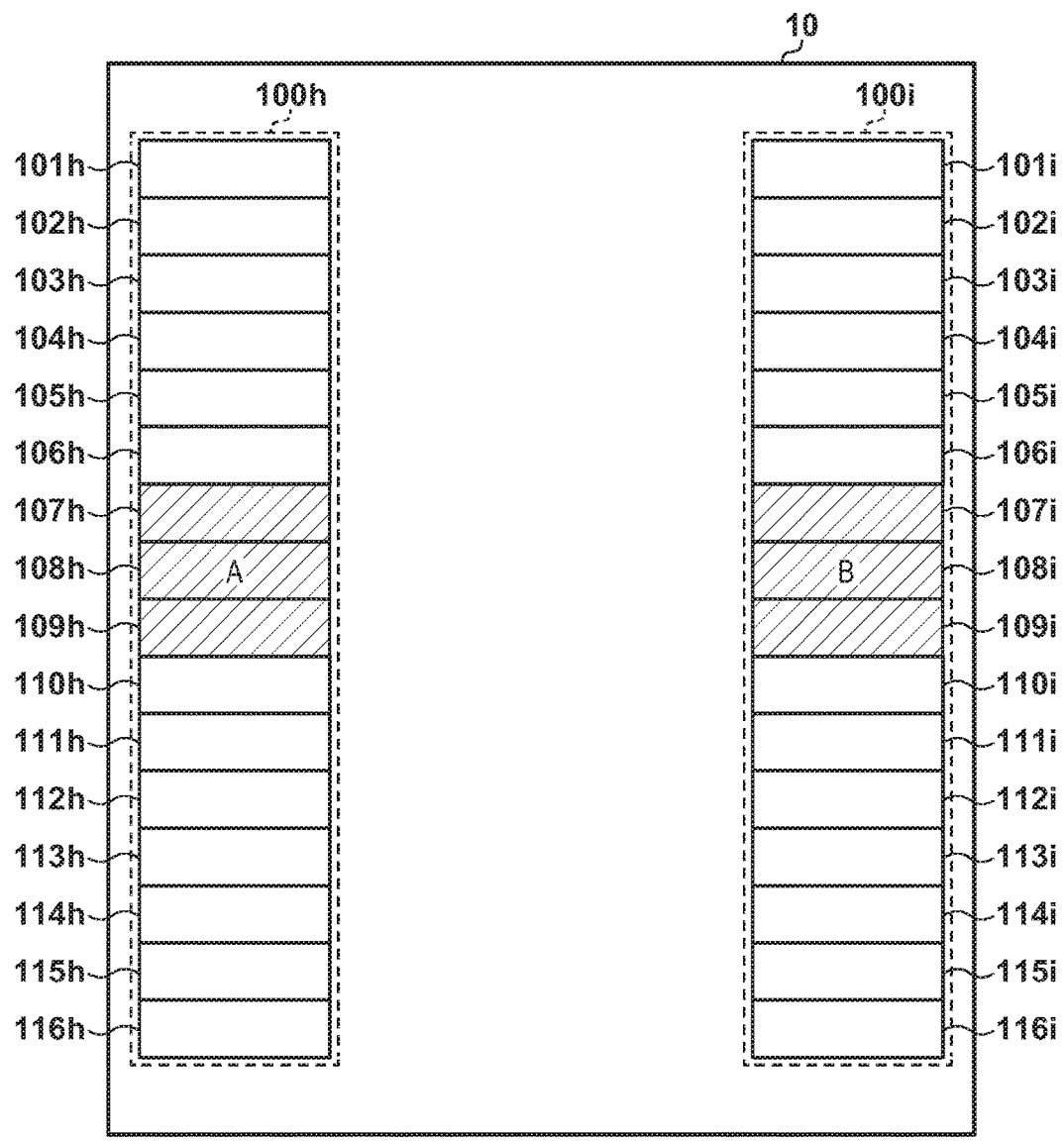
FIG. 11 is a diagram illustrating effective light-receiving elements when density detection is performed according to one embodiment.
Figure 19:
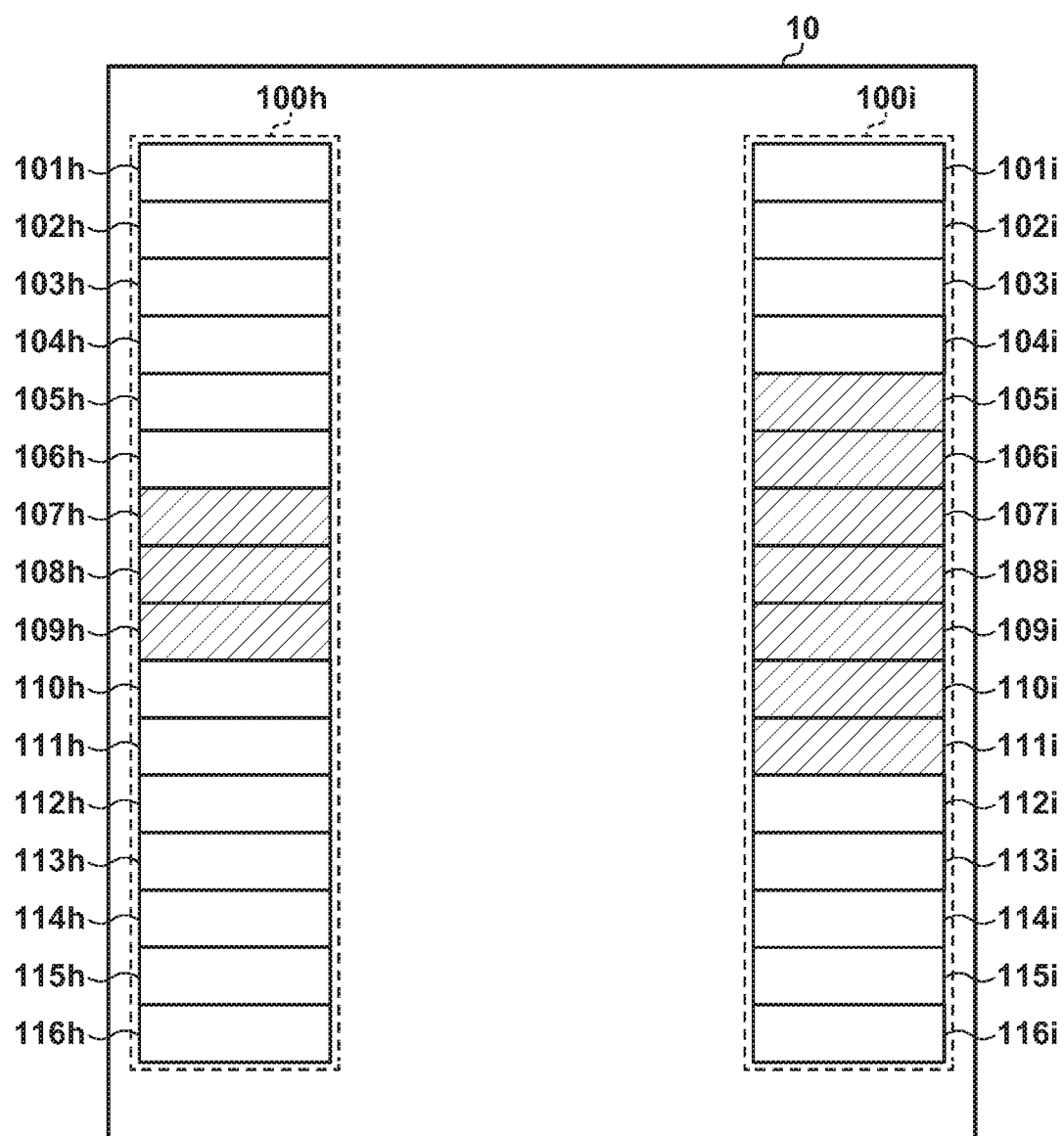
FIG. 19 is a diagram illustrating effective light-receiving elements when the density detection is performed according to one embodiment.

In the second embodiment, as shown in FIG. 11, the numbers of effective light-receiving elements respectively selected from the light-receiving element arrays 100*h* and 100*i* are the same in the density correction control. However, as will be described in the present embodiment, the number of effective light-receiving elements selected from the light-receiving element array 100*i* may be larger than the number of effective light-receiving elements selected from the light-receiving element array 100*h*. In FIG. 19, in the optical sensor 8 shown in FIG. 8, the light-receiving elements selected as the effective light-receiving elements at the time of density detection are shown as a shaded section. Specifically, one detection signal is generated by selecting the light-receiving elements 107*h* to 109*h* as the effective light-receiving elements. Also, one detection signal is generated by selecting the light-receiving elements 105*i* to 111*i* as the effective light-receiving elements. Then, the density is detected based on the difference between the two detection signals. In general, when the number of effective light-receiving elements selected from the light-receiving element array 100*h* is the same as the number of effective light-receiving elements selected from the light-receiving element array 100*i*, the amount of diffused reflection light to be output from the light-receiving element array 100*i* becomes small. Accordingly, by setting the number of effective light-receiving elements in the light-receiving element array 100*i* so as to be larger than the number of effective light-receiving elements in the light-receiving element array 100*h*, the density detection can be performed accurately.

Figure 20:
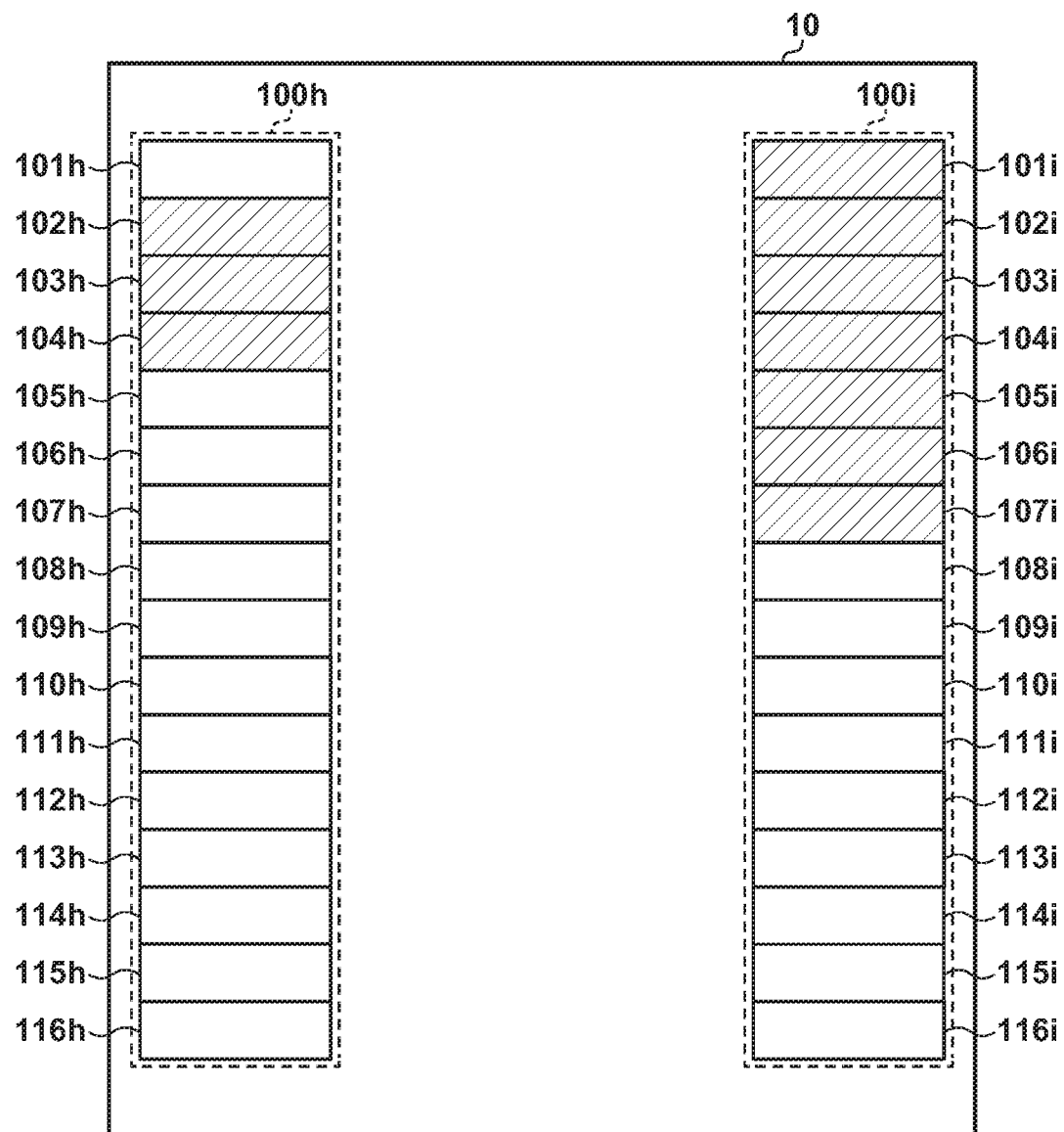
FIG. 20 is a diagram illustrating effective light-receiving elements when the density detection is performed according to one embodiment.

Note that, in the example in FIG. 19, the center of the effective light-receiving elements in the light-receiving element array 100*h* matches the center of the effective light-receiving elements in the light-receiving element array 100*i* in the sub-scanning direction. However, in the case where the position of the specularly reflected light illuminating a flat surface of the optical sensor 8 is shifted due to a mechanical variation, the center of the effective light-receiving elements in the light-receiving element array 100*h* may be different from the center of the effective light-receiving elements in the light-receiving element array 100*i*, as shown in FIG. 20. As a result of setting the effective light-receiving elements so as to receive a necessary amount of light, the change in light amount can be detected more accurately.

Also, the effective light-receiving elements in the light-receiving element arrays 100*h* and 100*i* when detecting the speed of the intermediate transfer belt 20 are shown by shaded sections in FIGS. 21A and 21B. When the specularly reflected light is used, the light-receiving elements 102*h*, 103*h*, 114*h*, and 115*h* are set as the effective light-receiving elements, as shown in FIG. 21A. When the diffused reflection light is used, the light-receiving elements 102*i* to 105*i* and 112*i* to 115*i* are set as the effective light-receiving elements, as shown in FIG. 21B. In the case where the speed is detected using the diffused reflection light, the number of effective light-receiving elements is increased compared with the case where the speed is detected using the specu-larly reflected light, and thus a greater amount of diffused reflection light can be received, and the speed detection is made possible by obtaining a sufficient amount of light. An amount of light in accordance with a condition can be detected by changing the settings of the effective light-receiving elements, and a more generic system can be formed with a simple configuration.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-218798, filed on Nov. 6, 2015, which is hereby incorporated by reference herein in its entirety.

What is claimed is:

1. An image forming apparatus comprising:
   a light-emitting unit configured to emit light toward an image carrier or a recording medium;
   a first light-receiving unit that includes a plurality of first light-receiving elements arranged along a first direction that is a movement direction of the image carrier or the recording medium, and is arranged so as to receive light emitted from the light-emitting unit and specularly reflected off the image carrier or the recording medium;
   a second light-receiving unit arranged at a different position from the first light-receiving unit in a second direction different from the first direction, and that includes a plurality of second light-receiving elements arranged along the first direction, the second light-receiving unit being arranged so as to receive light emitted from the light-emitting unit and reflected off the image carrier or the recording medium;
   a selection unit configured to select a first mode or a second mode, in the first mode, a first light-receiving element among the plurality of first light-receiving elements being set as a first effective light-receiving element and a second light-receiving element among the plurality of second light-receiving elements being set as a second effective light-receiving element, and in the second mode, a first light-receiving element among the plurality of first light-receiving elements or a second light-receiving element among the plurality of second light-receiving elements being set as a third effective light-receiving element;

a generation unit configured to generate, if the first mode is selected by the selection unit, a first detection signal from an output of the first effective light-receiving element and a second detection signal from an output of the second effective light-receiving element, and to generate, if the second mode is selected by the selection unit, a third detection signal from an output of the third effective light-receiving element; and a detection unit configured to detect i) a target formed on the image carrier or the recording medium or ii) a surface of the image carrier or the recording medium, based on the first detection signal and the second detection signal or based on the third detection signal.

2. The image forming apparatus according to claim 1, further comprising a storage unit configured to store selection information to select the first effective light-receiving element, the second effective light-receiving element or the third effective light-receiving element, wherein the selection unit is further configured to select the first effective light-receiving element, the second effective light-receiving element or the third effective light-receiving element based on the selection information.

3. The image forming apparatus according to claim 2, further comprising a control unit configured to store the selection information in the storage unit.

4. The image forming apparatus according to claim 1, further comprising a forming unit configured to form an image on the image carrier or the recording medium, wherein the target is the image, and the detection unit is furthermore configured to detect a position or density of the image based on the first detection signal and the second detection signal.

5. The image forming apparatus according to claim 4, wherein the selection unit is further configured such that a number selected as the first effective light-receiving element and the second effective light-receiving element when detecting the density of the image based on the first detection signal and the second detection signal is greater than a number selected as the first effective light-receiving element and the second effective light-receiving element when detecting the position of the image based on the first detection signal and the second detection signal.

6. The image forming apparatus according to claim 4, wherein, in the case where the detection unit detects the density of the image, the number of second effective light-receiving elements selected by the selection unit is equal to or greater than the number of first effective light-receiving elements selected by the selection unit.

7. The image forming apparatus according to claim 4, wherein the first light-receiving unit and the second light-receiving unit are arranged along the second direction, which is orthogonal to the first direction.

8. The image forming apparatus according to claim 1, wherein the selection unit is further configured to, in the second mode, set a fourth effective light-receiving element, the fourth effective light-receiving element being included in the same light-receiving unit as the third effective light-receiving element, the generation unit is further configured to generate, if the second mode is selected by the selection unit, a fourth detection signal from an output of the fourth effective light-receiving element, and the detection unit is configured to detect a moving speed of the image carrier or the recording medium based on a difference between a detection timing of the target detected by the third detection signal and a detection timing of the target detected by the fourth detection signal.

9. The image forming apparatus according to claim 1, wherein the selection unit is configured by hardware.

10. An optical sensor comprising:

a light-emitting unit configured to emit light toward a target that moves in a first direction;

a first light-receiving unit that includes a plurality of first light-receiving elements arranged along the first direction, and is arranged so as to receive light emitted from the light-emitting unit and reflected off the target;

a second light-receiving unit arranged on a different position from the first light-receiving unit in a second direction different from the first direction, and that includes a plurality of second light-receiving elements arranged along the first direction, the second light-receiving unit being arranged so as to receive light emitted from the light-emitting unit and reflected off the target;

a selection unit configured to select a first mode or a second mode, in the first mode, a first light-receiving element among the plurality of first light-receiving elements being set as a first effective light-receiving element and a second light-receiving element among the plurality of second light-receiving elements being set as a second effective light-receiving element, and in the second mode, a first light-receiving element among the plurality of first light-receiving elements or a second light-receiving element among the plurality of second light-receiving elements being set as a third effective light-receiving element;

a generation unit configured to generate, if the first mode is selected by the selection unit, a first detection signal from an output of the first effective light-receiving element and a second detection signal from an output of the second effective light-receiving element, and to generate, if the second mode is selected by the selection unit, a third detection signal from an output of the third effective light-receiving element; and an output unit configured to output the first detection signal and the second detection signal or to output the third detection signal.

11. The optical sensor according to claim 10, further comprising a storage unit configured to store selection information to select the first effective light-receiving element, the second effective light-receiving element or the third effective light-receiving element, wherein the selection unit is further configured to select the first effective light-receiving element, the second effective light-receiving element or the third effective light-receiving element based on the selection information.

12. The optical sensor according to claim 11, further comprising a communication unit configured to communicate with an external apparatus, wherein the selection information to be stored in the storage unit is acquired from the external apparatus.

13. The optical sensor according to claim 10,
wherein the first light-receiving unit is arranged so as to receive light emitted from the light-emitting unit and specularly reflected off the target, and
wherein the first effective light-receiving element is selected from the first light-receiving elements that are illuminated by the specularly reflected light in the first light-receiving unit.

14. The optical sensor according to claim 10,
wherein the output unit outputs the first detection signal and the second detection signal to an image forming apparatus or outputs the third detection signal to the image forming apparatus, and
the image forming apparatus is configured to detect a position or density of the target based on the first detection signal and the second detection signal or to detect a moving speed of the target based on the third detection signal.

15. The optical sensor according to claim 14,
wherein the selection unit is further configured to, in the second mode, set a fourth effective light-receiving element, the fourth effective light-receiving element being included in the same light-receiving unit as the third effective light-receiving element,
the generation unit is further configured to generate, if the second mode is selected by the selection unit, a fourth detection signal from an output of the fourth effective light-receiving element, and
the image forming apparatus is further configured to detect the moving speed of the target based on a difference between a detection timing of the target detected by the third detection signal and a detection timing of the target detected by the fourth detection signal.

16. The optical sensor according to claim 10, wherein the first light-receiving unit and the second light-receiving unit are arranged along a direction orthogonal to the first direction.

17. The optical sensor according to claim 10, wherein the selection unit is configured by hardware.

\* \* \* \* \*